(12) United States Patent
Mäder

(10) Patent No.: US 11,772,898 B2
(45) Date of Patent: Oct. 3, 2023

(54) DEVICES AND INSTALLATIONS FOR THE AUTOMATED STORAGE AND COMMISSIONING OF GOODS AND METHODS FOR OPERATING SUCH DEVICES AND INSTALLATIONS

(71) Applicant: WRH WALTER REIST HOLDING AG, Ermatingen (CH)

(72) Inventor: Carl Conrad Mäder, Hittnau (CH)

(73) Assignee: WRH WALTER REIST HOLDING AG, Ermatingen (CH)

(*) Notice: Subject to any disclaimer, the term of this patent is extended or adjusted under 35 U.S.C. 154(b) by 0 days.

(21) Appl. No.: 16/979,649

(22) PCT Filed: Mar. 12, 2019

(86) PCT No.: PCT/EP2019/056192
§ 371 (c)(1),
(2) Date: Sep. 10, 2020

(87) PCT Pub. No.: WO2019/175195
PCT Pub. Date: Sep. 19, 2019

(65) Prior Publication Data
US 2021/0002079 A1    Jan. 7, 2021

(30) Foreign Application Priority Data

Mar. 12, 2018    (CH) ..................................... 0030718

(51) Int. Cl.
*B65G 43/10* (2006.01)
*B65G 37/02* (2006.01)
(Continued)

(52) U.S. Cl.
CPC ............. *B65G 37/02* (2013.01); *B65G 47/53* (2013.01); *B65G 1/1376* (2013.01);
(Continued)

(58) Field of Classification Search
None
See application file for complete search history.

(56) References Cited

U.S. PATENT DOCUMENTS

| | | |
|---|---|---|
| 4,811,830 A | 3/1989 | Felder |
| 5,305,080 A | 4/1994 | Lee et al. |
| | (Continued) | |

FOREIGN PATENT DOCUMENTS

| | | |
|---|---|---|
| DE | 1185536 B | 1/1965 |
| DE | 32 15 744 A1 | 11/1983 |
| | (Continued) | |

OTHER PUBLICATIONS

Kamoun, F., et al., "An RFID solution for the monitoring of storage time and localization of perishable food in a distribution center," 2015 Global Summit on Computer & Information Technology (GSCIT), Jun. 11, 2015, pp. 1-6, doi: 10.1109/GSCIT.2015.7353319.

(Continued)

*Primary Examiner* — Kavel Singh
(74) *Attorney, Agent, or Firm* — Pauley Erickson & Swanson

(57) ABSTRACT

A conveying module includes a base structure; a first conveying device to convey a unit of goods in a first conveying direction (x) in the horizontal; a second conveying device to convey a unit of goods in a second conveying direction (y) in the horizontal, wherein the second conveying direction runs substantially perpendicular to the first conveying direction; a carrier structure to carry a unit of goods; a first lifting device to raise and/or lower the first conveying device in the vertical (z) between a lower position and an upper position; and a second lifting device to raise and/or lower the second conveying device in the vertical (z) between a lower position and an upper position; wherein a unit of goods located on the conveying module rests on the carrier structure when the (Continued)

first conveying device and the second conveying device are in the lower position.

34 Claims, 17 Drawing Sheets

(51) Int. Cl.
  *B65G 47/53* (2006.01)
  *B65G 1/137* (2006.01)
  *B65G 47/64* (2006.01)

(52) U.S. Cl.
  CPC .......... *B65G 1/1378* (2013.01); *B65G 47/642* (2013.01); *B65G 2203/0216* (2013.01); *B65G 2203/0233* (2013.01); *B65G 2203/0258* (2013.01)

(56) References Cited

U.S. PATENT DOCUMENTS

| | | | |
|---|---|---|---|
| 6,367,609 | B2 | 4/2002 | Caspi et al. |
| 7,588,139 | B1 * | 9/2009 | Campbell, III ........ B65G 21/14 198/606 |
| 8,479,912 | B2 * | 7/2013 | Layne ........................ B07C 3/08 198/348 |
| 9,334,113 | B2 | 5/2016 | Naylor |
| 10,081,495 | B2 * | 9/2018 | Møller ................... B65G 35/06 |
| 10,486,902 | B2 * | 11/2019 | Itoh ....................... B65G 1/0478 |
| 2002/0010527 | A1 * | 1/2002 | Wielebski ............ B65G 47/261 700/230 |
| 2004/0193311 | A1 | 9/2004 | Winkler |
| 2006/0080827 | A1 | 4/2006 | Saito et al. |
| 2012/0004766 | A1 | 1/2012 | Stoll et al. |
| 2014/0277693 | A1 | 9/2014 | Naylor |
| 2016/0229630 | A1 | 8/2016 | Gebherdt et al. |

FOREIGN PATENT DOCUMENTS

| | | |
|---|---|---|
| DE | 35 45 452 A1 | 6/1987 |
| DE | 38 23 728 A1 | 1/1990 |
| DE | 196 37 949 A1 | 3/1998 |
| DE | 100 09 087 A1 | 9/2001 |
| DE | 102 55 945 A1 | 6/2004 |
| DE | 20 2007 014 761 U1 | 3/2009 |
| DE | 10 2008 043 844 A1 | 5/2010 |
| DE | 10 2008 059 529 A1 | 6/2010 |
| DE | 10 2009 035 542 A1 | 10/2010 |
| DE | 10 2015 217 958 A1 | 3/2017 |
| EP | 0 268 323 A1 | 5/1988 |
| EP | 0 514 613 A1 | 11/1992 |
| EP | 2 184 424 A1 | 5/2010 |
| GB | 929920 A | 6/1963 |
| JP | 2005-280991 A | 10/2005 |
| JP | 2015-71463 A | 4/2015 |
| WO | WO 2006/087595 A1 | 8/2006 |
| WO | WO 2011/141450 A1 | 11/2011 |

OTHER PUBLICATIONS

URL:https://logistikknowhow.com/materialfluss-und-transport/cut-ff-zeit-in-der-intralogstik/, Logistik Knowhow: "Cut-off-Zeit in der Intralogistik," Jan. 28, 2016 (6 pages).
URL:https://web.archive.org/web/20171112015413/http://www.prologistik.com/logistik-lexikon/durchschnittlche-lagerdauer/, Prologistik: "Durchschnittliche Lagerdauer. Kura erklart in unserem Logistik-Lexikon!" Nov. 12, 2017 (1 page).
Gebhardt Fodertechnik GmbH, "Gebhardt FlexConveyor-Industry 4.0—Modular conveyor kit," Catalog, © 2014 Gebhardt Fodertechnik GmbH, Sinsheim, Germany (8 pages).
EPO (Riswijk, NL), English language version of the International Search Report, Form PCT/ISA/210, for International Application PCT/EP2019/056192, dated Sep. 2, 10 019 (4 pages).

* cited by examiner

DEVICES AND INSTALLATIONS FOR THE AUTOMATED STORAGE AND COMMISSIONING OF GOODS AND METHODS FOR OPERATING SUCH DEVICES AND INSTALLATIONS

BACKGROUND OF THE INVENTION

Field of the Invention

The invention relates to a conveying module for horizontally conveying units of goods in two mutually perpendicular directions, an installation for storage and/or commissioning of units of goods, and a method for controlling such an installation.

Discussion of Related Art

Automated warehouses, sorting installations and commissioning installations are important elements of intralogistics systems, particularly for the efficient storage and retrieval of single goods or units of goods, or for the provision of certain single goods or units of goods in a desired quantity and order, for example for processing in a production process, for commissioning orders, or for provision at interfaces to other transport systems such as trucks or railroad cars. For reasons of efficiency, it is desirable to perform the necessary transport and handling procedures as automatically as possible.

A problem with transport and handling procedures in intralogistics can be the inconsistency of the products to be transported and stored. Known from the prior art are therefore various transport carriers on which or in which the products can be stored in such a manner that the carriers can be transported or handled more easily with the transported goods as a unit of goods. Thus, for example, product deliveries are prepared and transported on standardized pallets, such as EPAL pallets. Such standardized pallets can be automatically transported with appropriate automated devices or stored/retrieved in storage systems. It is also known that other intermediate carriers such as platforms, baskets, and other basic structures, etc., on or in which the single goods are arranged for transport and/or storage, are also used.

DE 102015217958 A1 describes an automated parking garage in which a user parks a vehicle on a carrier platform at a transfer station and the carrier platform with the vehicle is then automatically stored in a multistory warehouse. From the transfer station the carrier platform is transported by belt conveyors to a lifting device, which then transports the carrier platform to the intended plane of the storage. The storage planes are equipped with grid-type rectangular transport devices, which are capable of conveying carrier platforms horizontally, selectively either along the longitudinal axis of the transport device or transversely to the longitudinal axis. For this purpose conveying belts are arranged in pairs on the lateral sides of the transport device. Depending on the desired conveying direction, one conveying belt pair is raised or the other conveying belt pair is lowered in such a manner that a carrier platform only rests on one conveying belt pair and can be conveyed unhindered thereby. Such a transport device therefore corresponds functionally to a two-dimensional belt conveyor. A carrier platform placed on a storage plane is conveyed with the transport devices to an unoccupied storage place and left there. Upon a corresponding request by the user, the desired vehicle on the carrier platform is then automatically removed from the storage and transported to the transfer station, where the user can pick up the vehicle again.

In the aforementioned automated parking garage, a new object is put into storage or a certain object is removed from storage upon request. It is important that the retrieval procedure is performed as quickly as possible in order to minimize the time the user has to wait for his vehicle. It is also important that after the storage of a vehicle an empty carrier platform is available for the next user as quickly as possible. Generally, such automated parking garages are intended for longer storage periods, since storage or retrieval takes a relatively long time and the occupancy rate of the individual storage places should be as high as possible.

DE 3823728 A1 also describes an automated parking garage system. A plurality of conveying modules move pallets specially adapted to the conveying modules in two directions in the horizontal. The conveying modules have three parallel roller conveying members in a first x-direction, and two pairs of parallel roller conveying members perpendicular thereto in a second y-direction. The roller conveying members in the x-direction or in the y-direction are raised in order to convey the pallet stored thereon in the corresponding direction. The pallets have intersecting, recessed channels on the underside thereof, on the base surface of which the rollers of the conveying module rest during the conveying procedure. The width of the running channels corresponds to that of the rollers in such a manner that when the pallet is conveyed in one conveying direction, the pallet is positively fixed in the horizontal perpendicular to the conveying direction. The correct alignment of the special pallets is ensured at all times, but only special pallets adapted to the conveying system can be used.

EP 2184424 A1 describes a further automated parking garage system. The conveying modules have a plurality of freely rotating balls on their upper side. These support ball bearings can permanently support a pallet located on the conveying module with minimum rolling resistance in the horizontal direction. The pallets are specially adapted to the conveying modules and have intersecting running grooves on the underside thereof having a polyamide running surface on which the support ball bearings of the conveying module permanently rest. When conveying a pallet in the horizontal, the pallet is positively fixed perpendicular to the conveying direction. The correct alignment of the special pallets is ensured at all times. To drive the pallets horizontally in the x/y-direction, pairs of toothed wheel drive reeds can be raised in a targeted manner in such a manner that a part of the toothed strap run is in operative connection with a toothed rail on the underside of the pallet. Even with this conveying system only special pallets adapted to the conveying system can be used.

US 2014/277693 A1 shows an automated storage system in which transport trolleys can move horizontally in two mutually perpendicular directions on wheels on a rail system. Depending on the desired movement axis, one of two wheel sets is raised or lowered in such a manner that only one wheel set rests on the corresponding rails.

The same document also shows a conveying device in which a plurality of conveying straps of a strap conveyor are provided between a plurality of conveying rollers of a roller conveyor parallel to the aforementioned rollers. By lowering or raising the conveying rollers or the conveying straps, a single good or a storage container can be conveyed horizontally either by the roller conveyor along a first axis or by the strap conveyor perpendicular to the first axis. Such a transport device is arranged on one of the aforementioned transport trolleys in order to transfer goods from one transport trolley to another.

The company GEBHARDT Fördertechnik GmbH, Sinsheim, Germany, sells under the name "Gebhardt Grid-Sorter" a sorting system in which incoming packages are conveyed at one or a plurality of entries to a certain exit. For this purpose, transport devices as discussed above for US 2014/277693 A1 are arranged in a two-dimensional grid to transport a package from any entry via the sorting field to any exit, thus achieving the sorting.

There is a general need for improvement in this field.

SUMMARY OF THE INVENTION

The object of the invention is to provide conveying modules and logistics installations of the type mentioned at the beginning, which do not have the aforementioned and other disadvantages. Particularly a conveying module according to the invention should be flexible in use and easy to assemble. An installation according to the invention should be able to efficiently commission and/or store units of goods while requiring little space.

Another object of the invention is to operate an installation according to the invention in such a manner that stored units of goods can be retrieved quickly and efficiently.

A further object is to provide a conveying module or an installation according to the invention, which can be manufactured more cost-effectively and/or require less maintenance.

According to the present invention, these objects are achieved by the elements of the independent claims. Further advantageous embodiments can also be found in the dependent claims and the description.

The solution according to the invention can be further improved by various configurations which are advantageous in themselves and, unless implemented differently, can be combined with one another as desired. These embodiments and the advantages associated therewith are discussed below.

In the context of this description, the term "single goods" or "unit of goods" generally refers to individually transportable units, such as workpieces, semi-finished items and items in production processes, spare parts, consumer goods, stacks of stackable goods, for example stacks of printed products, but also containers and transport carriers for goods, such as boxes, containers, pieces of luggage, barrels, packages, pallets, etc. The terms "single goods," "unit of goods" and "pallet" are used as synonyms in this description unless otherwise stated.

One aspect of the invention relates to an advantageous conveying module for horizontally conveying units of goods, comprising a basic structure for storing the conveying module on a base; a first conveying device which is designed to convey a unit of goods in a first conveying direction in the horizontal; a second conveying device which is designed to convey a unit of goods in a second conveying direction in the horizontal, wherein the second conveying direction is substantially perpendicular to the first conveying direction; a carrier structure which is designed to carry a unit of goods; a first lifting device which is designed to raise and/or lower the first conveying device vertically in relation to the carrier structure and/or the second conveying device between a lower position and an upper position; and a second lifting device which is designed to raise and/or lower the second conveying device vertically in relation to the carrier structure and/or the first conveying device between a lower position and an upper position; wherein a unit of goods located on the conveying module rests on the carrier structure when the first conveying device and the second conveying device are in the lower position.

For example, the carrier structure may comprise two or a plurality of parallel horizontal carriers, or a continuous horizontal panel.

A conveying module according to the invention allows three functional configurations: In a first conveying configuration, the first conveying device of a unit of goods can convey in the X-direction. In a second conveying configuration, the second conveying device of a unit of goods can convey in the Y-direction. In a third storage configuration, a unit of goods can be stored on the conveying module.

A conveying module according to the invention makes it possible to bring the two conveying devices into a storage configuration in which the unit of goods rests on the carrier structure but not on the conveying devices. In this manner, a unit of goods can be left on a conveying module for a longer period of time without the conveying devices being subjected to continuous weight load. Accordingly, components of the conveying devices can be made of materials that are lighter or less expensive, such as polymer materials, without the risk of damage to the conveying devices during long periods of storage, such as material fatigue or deformation. Such a conveying module according to the invention is therefore particularly advantageous for use in installations in which goods members are not moved over a longer period of time, for example in a storage system.

The dimensioning as well as the carrying force and conveying performance of a conveying module according to the invention are advantageously adapted to the dimensions and weight of the units of goods to be conveyed. For example, a base surface of a conveying module of, for example, 600×800 mm is sufficient for the transport of units of goods in the size of suitcases, boxes, aircraft trolleys and the like having a weight of, for example, up to 150 kg. A base surface of 900×1300 mm and a carrying force of 1200 kg are sufficient for conveying pallets according to the EPAL standard. For conveying heavy loads, an even larger base surface or an even larger carrying load can be provided. For example, a base surface of 2200×3500 mm and a carrying force of 4000 kg is sufficient for conveying machines or larger machine parts.

Advantageously, a conveying module according to the invention has an electronic control device which is designed to control the operation of the first and the second conveying device and the first and the second lifting device.

Such a conveying module, which is designed to exchange data with control devices of adjacent conveying modules in order to synchronize the operation of the conveying devices of the adjacent conveying modules, is particularly advantageous.

Advantageously, the control device of a conveying module according to the invention has a network interface to a local data network, for example an Ethernet interface or a WLAN interface. Two or a plurality of interfaces can also be provided in such a manner that, for example, a plurality of network modules can be connected in a linear or tree-like manner in order to form a data network.

In an advantageous embodiment of a conveying module according to the invention, the first conveying device defines a first resting plane, the second conveying device defines a second resting plane, and the carrier structure defines a third resting plane, wherein in the upper position of the first conveying device or of the second conveying device, respectively, the first resting plane or the second resting plane, respectively, is located above the third resting plane, and wherein a unit of goods located on the conveying module rests on the uppermost of the three aforementioned resting planes.

In another advantageous embodiment of a conveying module according to the invention, the first lifting device translatably moves the first conveying device between the lower position and the upper position during lifting and lowering; and/or the second lifting device translatably moves the second conveying device between the lower position and the upper position during lifting and lowering.

Alternatively or additionally, the first lifting device rotates the first conveying device between the lower position and the upper position during lifting or lowering; and/or the second lifting device rotates the second conveying device between the lower position and the upper position during lifting or lowering.

Such a rotating movement may particularly involve a tilting movement relative to the vertical. For example, a conveying device on one lateral side may be rotatably stored on a horizontal axis. In the upper position, the conveying device is horizontally aligned and is located above the carrier structure, and in the lower position, the conveying device is tilted in relation to the horizontal in such a manner that it rests underneath the carrier structure. Such a variant allows a less complex lifting device than with a translatory movement.

A further advantageous embodiment of a conveying module according to the invention has a third lifting device which is designed to raise and/or lower the carrier structure vertically in relation to the base structure between a lower position and an upper position.

In such a variant of a conveying module according to the invention, for example, the first conveying device can be arranged immovably in relation to the base structure, the second conveying device can be displaced in the vertical in relation to the first conveying device, and the carrier structure can be displaced in relation to the base structure. In this case, the third lifting device is at the same time the first lifting device, since it can raise and/or lower the first conveying device in the vertical in relation to the carrier structure between a lower position and an upper position.

It is advantageous that the third lifting device is also controlled via the control device of the conveying module.

The carrier structure can be raised and lowered by a translatory movement and/or by a rotation of the carrier structure.

The first conveying device, the second conveying device and if necessary the carrier structure can each be moved as a unit, or divided into different members. Thus, for example, individual belt conveyors of a conveying device can be moved differently and/or independently of one another, or the carrier structure can have different carrying parts that can be moved differently and/or independently of one another.

Other constellations are also possible, wherein in each case two lifting devices are sufficient to realize the three functional configurations.

In an advantageous embodiment of a conveying module according to the invention, sensor devices are provided for detecting the passage of a unit of goods during a conveying procedure, and/or for determining the alignment of a unit of goods located on the conveying module, and/or for reading an identification element, for example an RFID or an optical code, of a unit of goods located on the conveying module.

A conveying module according to the invention has advantageously means for weighing a unit of goods located on the conveying module.

A conveying module according to the invention can further advantageously have means for attaching a data member to a unit of goods located on the conveying module. For example, a labelling device may be provided which can attach a label to a unit of goods. A barcode printing device can also be provided, which can print a barcode on the unit of goods without contact, for example a distance inkjet printer. There may also be a device provided which can attach RFID units to the goods devices, for example RFID labels.

A conveying module according to the invention has advantageously an almost rectangular basic shape. This particularly facilitates a grid-type arrangement.

A conveying module according to the invention advantageously has one or a plurality of guiding members, which are designed to spatially limit in a certain direction movements in the horizontal plane of units of goods arranged on and/or conveyed by the conveying module.

Particularly advantageously, the at least one guiding member of such a conveying module includes a guide wheel which can be rotated about the vertical.

Alternatively or additionally, in such a conveying module the at least one guiding member comprises a guide rail or a guide sheet arranged parallel to an outer side of the conveying module.

The at least one guiding member is advantageously movable back and forth between a first position and a second position. In the first position, the at least one guiding member is operative and can spatially limit in a certain direction movements in the horizontal plane of units of goods arranged on and/or conveyed by the conveying module. In the second position, the at least one guiding member is non-operative and cannot spatially limit a horizontal movement of a unit of goods.

The first conveying device and/or the second conveying device of a conveying module according to the invention is advantageously a belt conveyor or a roller conveyor.

Particularly advantageously, in a conveying module according to the invention, the first conveying device and/or the second conveying device is a belt conveyor in which the conveyor belts rest on a roller arrangement and/or an anti-friction bearing. The conveyor belts can be designed as continuous belts or as composite modular belts.

Particularly advantageously, in a conveying module according to the invention, the first conveying device and/or the second conveying device is a belt conveyor which comprises two or a plurality of conveying belts, particularly two or a plurality of parallel conveying belts.

Particularly advantageous in the case of such a conveying module according to the invention is that the two or the plurality of conveying belts can run at different speeds.

Alternatively or additionally, in the case of such a conveying module according to the invention, the two or a plurality of conveying belts can be controlled separately by a control device of the conveying module.

Another aspect of the invention relates to an advantageous installation for storing and/or commissioning units of goods, comprising a plurality of conveying modules, as discussed above, according to the invention; and a control device for controlling the aforementioned conveying devices.

Installations according to the invention can be used to commission randomly provided units of goods and make the resulting groups of units of goods available for further use in a predetermined sequence, for example for loading. In another possible use, installations according to the invention allow for an efficient storage of units of goods in terms of volume utilization while simultaneously optimizing access time to stored units of goods. Such applications are particularly advantageous where expensive storage volumes are involved, for example in a cold storage room, drying room or ripening room, or in the cargo hold of a ship.

The procedures of commissioning and storage can also be combined in an installation according to the invention. For example, units of goods can be inserted in any sequence into an installation according to the invention, where they can be commissioned and then made available and/or stored ready for later removal. If, at a later point in time, the sequence of the units of goods intended for removal changes, the installation can re-commission the stored units of goods.

It is advantageous in such an installation according to the invention that the conveying modules are arranged in one or a plurality of rectangular grids, on which units of goods can be shifted in both conveying directions.

Alternatively or additionally, in an installation according to the invention, the conveying modules are arranged in a plurality of rectangular grids, on which units of goods can be shifted in the two conveying directions, wherein the various rectangular grids are arranged on one plane or on a plurality of planes, and are operatively connected to one another via conveying devices, for example conveying modules or lifting devices.

An arrangement on a plurality of planes leads to a better utilization of space, which allows an increase in storage space, and/or an increase in commissioning efficiency, as more maneuvering space is available.

It is advantageous to have a plurality of transport platforms arranged on the conveying modules, on which units of goods can be supported and can conveyed in the installation together with the transport platform.

In an advantageous embodiment of an installation according to the invention, the control device of the installation comprises at least one control unit which is designed to control the conveying modules and a planning unit which is designed to determine conveying procedures and to transmit corresponding conveying instructions to the at least one control unit.

The control device may comprise a plurality of control units which, for example, each control only a part of the conveying modules of the installation, for example the conveying modules of a certain plane or of a certain grid field.

It is advantageous in the case of an installation according to the invention that the control device of the installation is designed to perform a method according to the invention, as discussed below.

A further aspect of the invention relates to a method for controlling an installation according to the invention as discussed above for storing and/or commissioning units of goods, in which units of goods are shifted on a first grid field of conveying modules in such a manner that a certain unit of goods comes to rest on a certain point of the grid field, wherein the units of goods are distributed on the grid in such a manner that at least one conveying module remains unoccupied and forms a gap; and the certain unit of goods is removed from the installation at the certain point or is conveyed into another grid field; wherein the aforementioned steps are repeated in such a manner that the units of goods removed from the installation or conveyed into a second grid field of conveying modules form a certain succession.

It is advantageous with such a method that the units of goods removed from the installation or conveyed to a second grid field are grouped together according to certain commissioning orders and provided for further use.

Alternatively or additionally, in a method according to the invention, units of goods are distributed to a plurality of third grid fields of conveying modules, from which they can be removed again at a later time and used for further steps.

Particularly advantageous is to distribute the units of goods to the third grid fields in such a manner that the average time required until on average a unit of goods would be available for further use does not exceed a certain value.

It is advantageous to perform a method according to the invention with an installation according to the invention.

Another aspect of the invention relates to a method for controlling a conveying module according to the invention, in which the first conveying device and/or the second conveying device is/are a belt conveyor comprising two or a plurality of conveying belts, particularly two or a plurality of parallel conveying belts. In such a method according to the invention, the alignment of a unit of goods is determined in relation to the horizontal conveying directions of the conveying module;

the aforementioned unit of goods is at least partially supported on two or on a plurality of conveying belts of the conveying module; and the aforementioned conveying belts are controlled in such a manner that the combined movement of the conveying belts causes a rotational movement of the unit of goods about the vertical due to the static and/or sliding frictional contact of the conveying belts with the aforementioned unit of goods.

Such a method makes it possible to detect and actively correct faulty locations of units of goods. This makes it possible to convey units of goods that are not specifically adapted to the conveying modules used and particularly have no guide members with which a conveying module could interact.

It is advantageous with such a method according to the invention that the unit of goods rotates about the vertical at the same time as the unit of goods moves in a translational movement during conveying in one conveying direction.

Alternatively or additionally, in such a method according to the invention, an actual rotational and/or translational movement of the unit of goods is determined and the corresponding data is used to control the two or a plurality of conveying belts of the conveying module.

BRIEF DESCRIPTION OF SEVERAL VIEWS OF THE DRAWINGS

For a better understanding of the present invention, reference is made below to the drawings. These only show embodiments of the subject matter of the invention and are not suitable for limiting the invention to the features disclosed herein. The same or similar reference signs are used in the following figures and the corresponding description for identical or similar elements, in which.

DETAILED DESCRIPTION OF THE INVENTION

Figure 1:
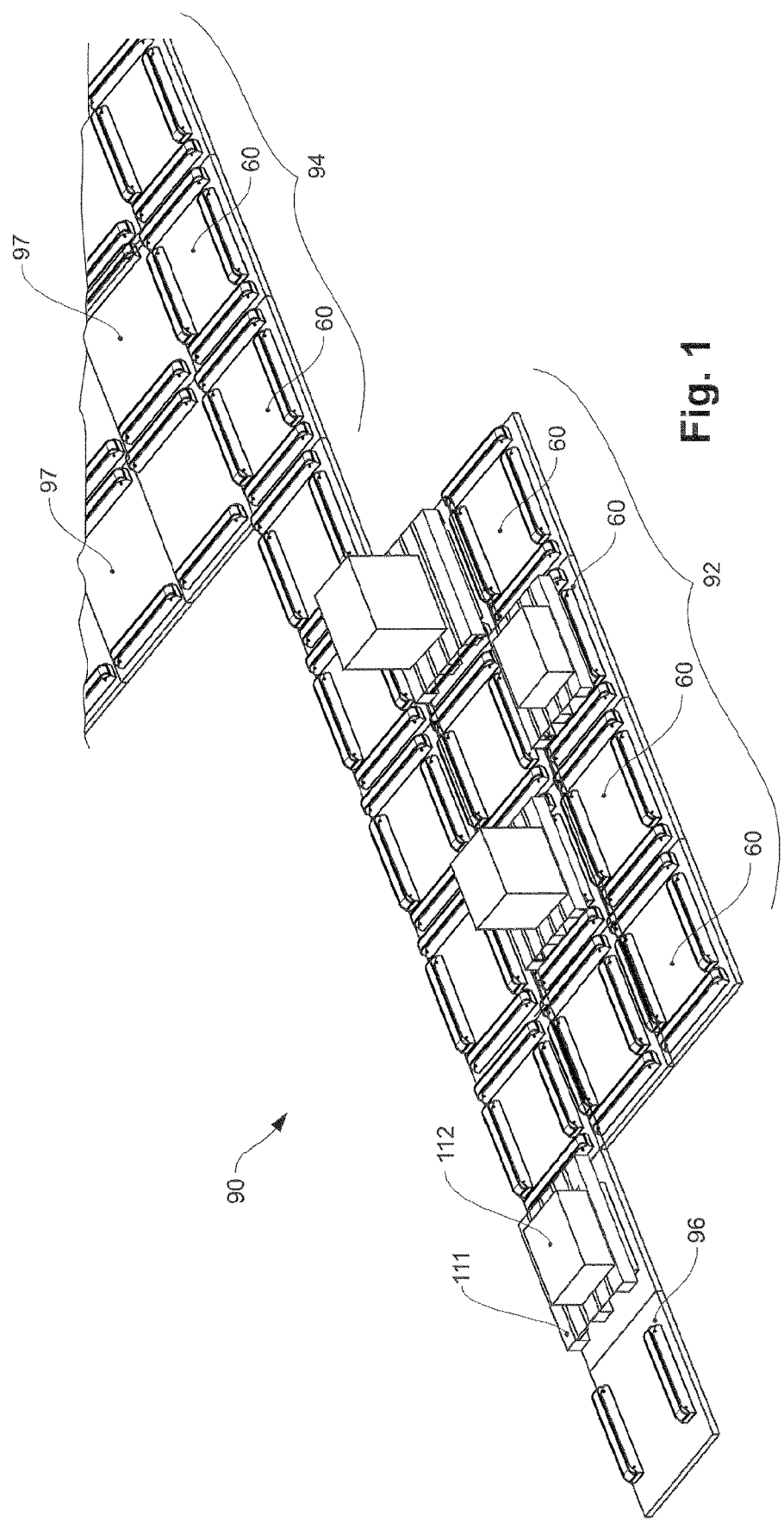
FIG. 1 is a schematic perspective view of an embodiment of an installation for automated commissioning of single goods in a small space.
Figure 2:
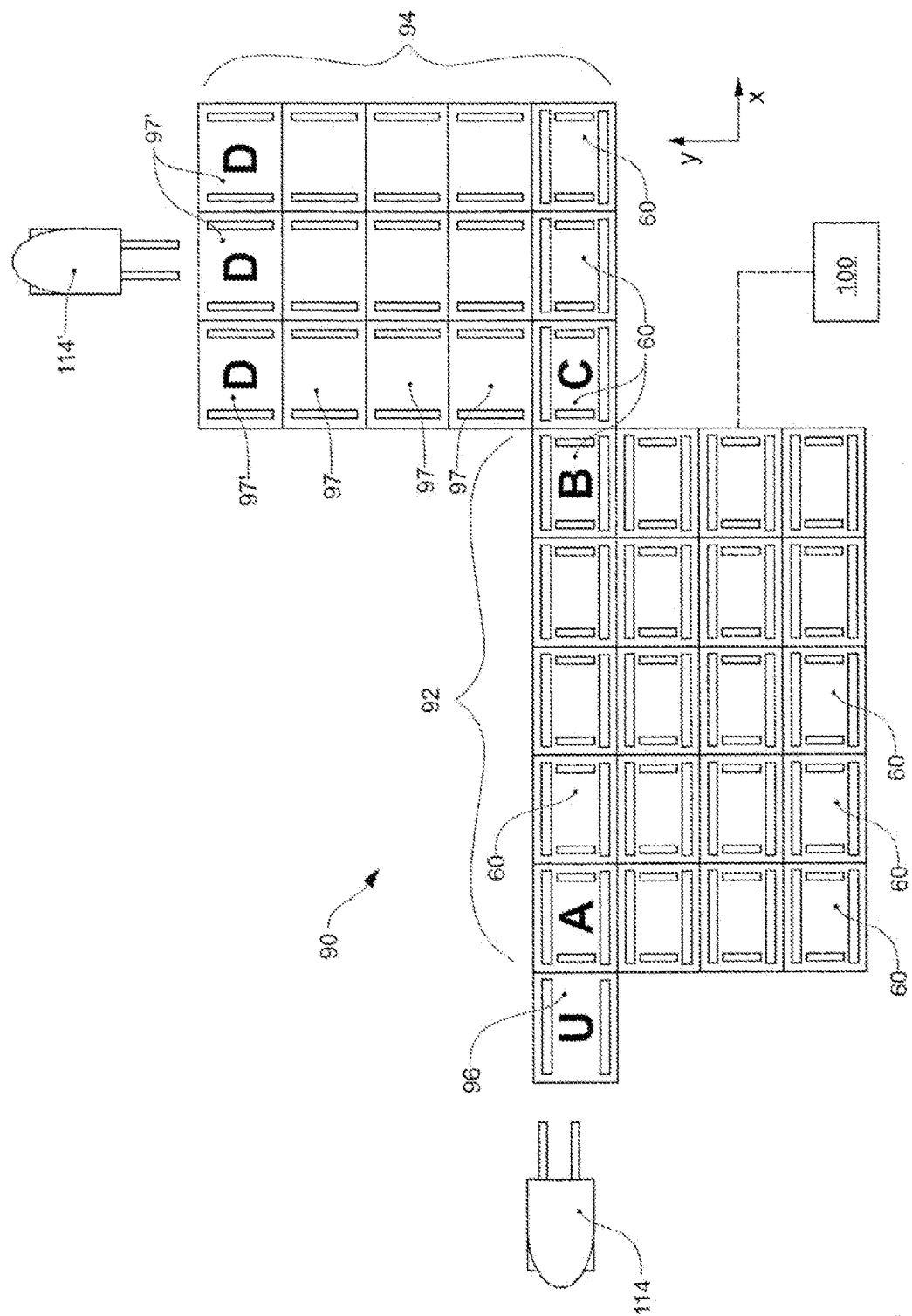
FIG. 2 is a schematic top view of the installation according to the invention from FIG. 1.

FIGS. 1 and 2 show an advantageous embodiment of a commissioning system 90 according to the invention, which is especially suitable for automatically commissioning units of goods and providing them grouped in the correct sequence according to the commissioning orders. The device 90 comprises a commissioning field 92, in the embodiment shown consisting of 5×3 grid-type xy-conveying modules 60. The corresponding xy-conveying modules 60 are discussed in detail below in connection with FIGS. 8, 9 and 10. The conveying modules 60 allow the horizontal conveying of units of goods, in the example shown EPAL pallets 111 having containers with goods 112 stacked on them, either along the x-axis or the y-axis.

The commissioning installation 90, particularly the various conveying modules 60, 96, 97', is controlled by a control device 100, which is connected to the conveying modules via a suitable wire-based data connection, which will be discussed in more detail below. Wireless data transmission to individual or all installation members is also possible. The installation control device 100 sends control commands to the individual conveying modules, and can receive status messages and other data from the conveying modules.

A conveying module 96 conveying in x-direction allows the transfer of a unit of goods to the commissioning field 92, i.e. to a certain input point A of the grid. With the aid of a forklift 114 or a transpallet or another conveying vehicle, a pallet/unit of goods 111 is placed on two parallel belt conveyors of the x-conveying module 96 of this transfer point U. The conveying vehicle 114 can be realized as an autonomously controlled unit or can be operated manually, or it can be operated remotely by an operator or a superior control device.

The identity of the transferred pallet/unit of goods is communicated to the installation control device 100 by appropriate means, for example by scanning a barcode or by reading other suitable identification means, such as RFID. Subsequently, the two belt conveyors of the x-conveying module 96, U and the aligned two belt conveyors of the adjacent xy-conveying module 60, which represents an input point A of the commissioning field 92, convey the unit of goods to the aforementioned conveying module 60, A, as shown in FIG. 1.

On the commissioning field 92, the various units of goods 111 are continuously arranged on the grid field by suitable position shifts in such a manner that the units of goods can be dynamically placed in a desired sequence on a certain xy-conveying module 60, which represents an output point B of the grid. A unit of goods can be transferred from this conveying module 60, B, to an xy-conveying module 60 (entry point C) of an adjacent provision field 94. In the embodiment shown, the provision field 94 consists of three xy-conveying modules 60 and then 3×5 y-conveying modules 97 conveying in y-direction. The provision field 94 serves as an intermediate storage for the units of goods provided and commissioned. At the three terminal y-conveying modules 97' (removal points D), the units of goods can in turn be removed by a forklift 114' or a pallet truck in order to be loaded into a truck, for example.

Such a commissioning installation 90 according to the invention allows, among other things, the commissioning and provision of delivery orders to be widely automated. If a commissioning installation 90 according to the invention is to be used for loading a truck as in the embodiment shown, the pallets of single delivery orders are to be provided in such a manner that they can be loaded grouped by destination in a suitable sequence, i.e. in the opposite sequence to the planned delivery tour of the truck. For this purpose, the units of goods are to be provided in the groups corresponding to the destination or commissioning order in the necessary loading sequence on the provision field 94. The corresponding units of goods can then be removed and loaded at the removal points without the need for further sorting procedures. If a plurality of removal points are provided, as in the embodiment shown, units of goods of a related group of a commissioning order, which can be loaded without a certain sequence, can be deposited simultaneously at the unloading points and removed and loaded from there.

The pallets of the next commissioning order are preferably conveyed to the removal points D only after all units of goods of a previous commissioning order have been loaded. In this manner it is ensured that the loading sequence of the pallets is correct, without the driver of a forklift 114' requiring further information or having to make his own decisions, thus avoiding corresponding sources of error. Alternatively, suitable signaling means can be used to indicate which units of goods can already be loaded. These signaling means may, for example, be provided on the conveying modules 97' of the removal points. Conceivable, for example, are optical signalizations such as a simple red-green light signal installation, or a screen display, etc. A corresponding indication on a display of the forklift is also possible.

If the corresponding conveying vehicles are autonomously controlling units or if they are automatically operated by remote control by a superior control device, the corresponding instructions are advantageously transmitted to the autonomous control device of the conveying vehicle or to the superior control device.

For continuous filling of the provision field 94, a unit of goods can be removed at the output point B of the commissioning field 92 and distributed via the three xy-modules 60 of the provision field 94 to the three columns of the provision field running in y-direction. The installation control device 100 maneuvers the xy-transfer modules 60 of the commissioning field in such a manner that the units of goods shift continuously on the grid in such a manner that the currently required units of goods land and can be removed at the exit point B, and the entry point A is available to receive a new unit of goods.

The control device 100 determines certain movements of the units of goods in order to achieve the necessary sorting of the units of goods at point B. Thereby, simulations are performed over a certain period of time in order to perform the sorting while optimizing certain target parameters, for example throughput, energy efficiency. The interchangeability of identical units of goods between different commissioning orders can also be considered. Data on future commissioning orders or the identity of expected new units of goods can also be considered, particularly information on any existing pre-sorting. Experience values can also be considered, as well as information about the operating personnel (e.g. number, break times, working hours, shift changes, etc.), and planned and actual schedules for the trucks, etc.

In order to increase the speed of the necessary shifting procedures, a plurality of shifting procedures can be performed simultaneously within the scope of what is physically possible in the grid field, for example, the shifting of a unit of goods from a first to a second module and the shifting of another unit of goods from a third to a fourth module.

The shifting procedures are advantageously clocked, which simplifies the synchronization of the parallel conveying procedures.

It is further possible that a first conveying module conveys a unit of goods in a certain direction to a second conveying module and at the same time receives another unit of goods on the opposite lateral side from a third module. Such combinations of shifting procedures can be advantageous with respect to time or energy requirements, but this is always the case. Accordingly, such possible combinations of movement procedures can also be part of a simulation of the control device and be included in the decision process of the control device 100.

If a malfunction occurs in a conveying module, the control device 100 can also consider this by marking the corresponding grid field as blocked until the malfunction is eliminated, or by rejecting simulation solutions that use this grid field. Even a partial malfunction, for example the failure of the belt conveyors of a conveying module only in one of the two directions, can be considered accordingly.

In this manner, the error tolerance of the installation can be maximized. Unscheduled downtimes of the installation can be reduced or avoided altogether, since the replacement or repair of conveyor units can be coordinated or can be performed during a regular maintenance period. If necessary, in order to perform a repair, small parts of the grid field can be deactivated and locked out of operation by the control device in order to allow maintenance personnel access to a certain grid field during operation.

A core parameter that determines the speed of the commissioning, and therefore the maximum possible throughput of a commissioning installation, is the number of available gaps in the grid of the commissioning field, i.e. the number of unoccupied conveying modules. Basically, a unit of goods can be conveyed from any position in the grid field to any other position, particularly from the entry point A to the exit point B, as long as a single gap is available for maneuvering the units of goods. However, the speed of the overall process rapidly drops towards zero as the number of gaps decreases. Accordingly, this has to be considered when designing a commissioning installation according to the invention.

Also a tributary, for example a driver of a forklift 114, does not need any information about a certain unit of goods, which is to be transferred to the commissioning installation 90 at the transfer point U. A plurality of tributaries can operate one or a plurality of common transfer points. The control device 100 can dynamically consider the effective positions of the individual newly delivered units of goods, for example by continuously adjusting the simulations on which the control of the unit of goods shifting is based. However, it is also possible for the commissioning installation 90 to influence the supply, for example by informing by means of appropriate signaling means at which of the plurality of transfer points the next unit of goods is to be deposited. It is also possible to indicate which forklift is to deposit the unit of goods thereof at which transfer point. A corresponding indication on a display of the forklift is also possible. It may also be useful for the installation control device 100 to temporarily stop the further supply of new units of goods in order to prevent an excessive reduction in the throughput of a commissioning installation due to overcrowding.

If the corresponding conveying vehicles are autonomously controlling units or if they are automatically operated by remote control by a superior control device, the corresponding instructions are advantageously transmitted to the autonomous control device of the conveying vehicle or to the superior control device.

The feeding of the units of goods can also be automated, for example by remote-controlled conveying vehicles or by suitable automated remote conveying systems such as belt conveyors, roller conveyors, etc.

It is also possible to provide one or a plurality of conveying modules with weighing means that allow the weight of a unit of goods thereon to be determined. For example, a pair of belt conveyors can be arranged on corresponding scale sensors in such a manner that the weight of a unit of goods stored thereon can be determined. Alternatively, the entire conveying module can be arranged on a scale. Corresponding data on the weight of a unit of goods can be used for follow-up checks, for example to verify the identity or the loading of a pallet by comparing the measured weight with a target weight according to the load specification. Furthermore, the weight information can be used to plan the optimal loading of a truck.

Due to the modularization into individual xy-conveying modules 60, devices according to the invention can be flexibly adapted to different local conditions. Thereby, in addition to the available space conditions, the required operating characteristics of the commissioning installation can also be considered in the design. In addition to the geometry of the commissioning field and the provision field, this design also comprises the number and position of the input points A and removal points D. Correspondingly, concrete embodiments of commissioning installations according to the invention can look very different.

The alignment of the conveying modules in the embodiments of commissioning installations according to the invention discussed above and below is only to be understood as an example. For example, the xy-conveying modules can alternatively be arranged in the grid field rotated by 90°.

Figure 3:
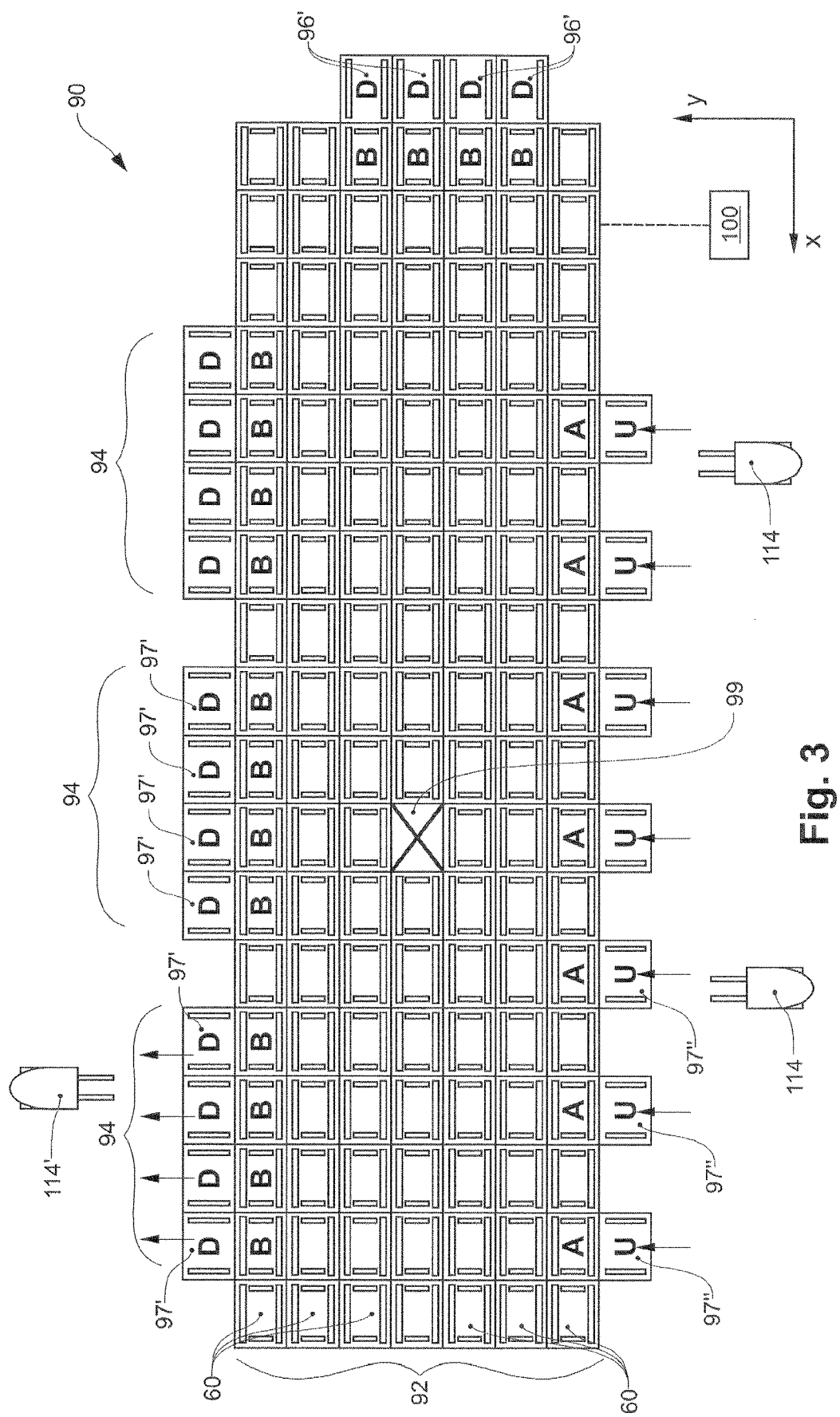
FIG. 3 is a top view of another embodiment of an installation according to the invention.

A further embodiment of a commissioning installation 90 according to the invention is shown schematically in FIG. 3. A commissioning field 92 consists of xy-conveying modules 60 on a 16×7 grid. The commissioning installation 90, particularly the various conveying modules 60, 96', 97', 97", is in turn controlled by an installation control device 100.

In the example shown, the provision field is integrated into the commissioning field, or the provision field and the commissioning field are created in a common grid field. Such a topology of the raster field allows a more flexible utilization of the commissioning installation, since certain areas of the raster field can be reserved primarily for one or the other function or both functions, as required, and this assignment can be changed continuously.

Such a grid field is particularly advantageous as a dynamic buffer for units of goods. Since the provision of groups of commissioning orders can be made more flexible locally, units of goods can not only be sorted in the commissioning field, but the commissioning field can also provide some short-term storage capacity for the units of goods.

The grid of the commissioning field can also contain gaps. In the example shown, a gap 99 without the conveying module is provided in the commissioning field 92, for example, in which, for example, infrastructure members that cannot be shifted can be arranged, such as a supporting structure of a hall roof.

The commissioning field can be loaded with new pallets/units of goods via y-conveying modules 97" at seven entry points A. At three groups of four exit points B respectively, units of goods can be transferred to corresponding y-conveying modules 97 of the corresponding removal points D. From there, for example, a forklift 114 can take over the pallets/units of goods and load them into a truck. In the embodiment shown, three groups of removal points D are provided in the upper area of FIG. 3, each of which is assigned to a truck port. On the right lateral side, a further, fourth group of removal points D in the form of x-conveying modules 96' is provided, which is assigned to a fourth truck port.

Instead of the linear y-conveying modules 97, 97', 97" or the linear x-conveying modules 96, 96' as in the aforementioned embodiment, xy-conveying modules 60 can also be used in the provision fields and the transfer points U or in the removal points D. This functionally enlarges the commissioning field. It is also possible to arrange the transfer points U and/or removal points D within the commissioning field at the edge thereof, as shown in the following example.

Figure 4:
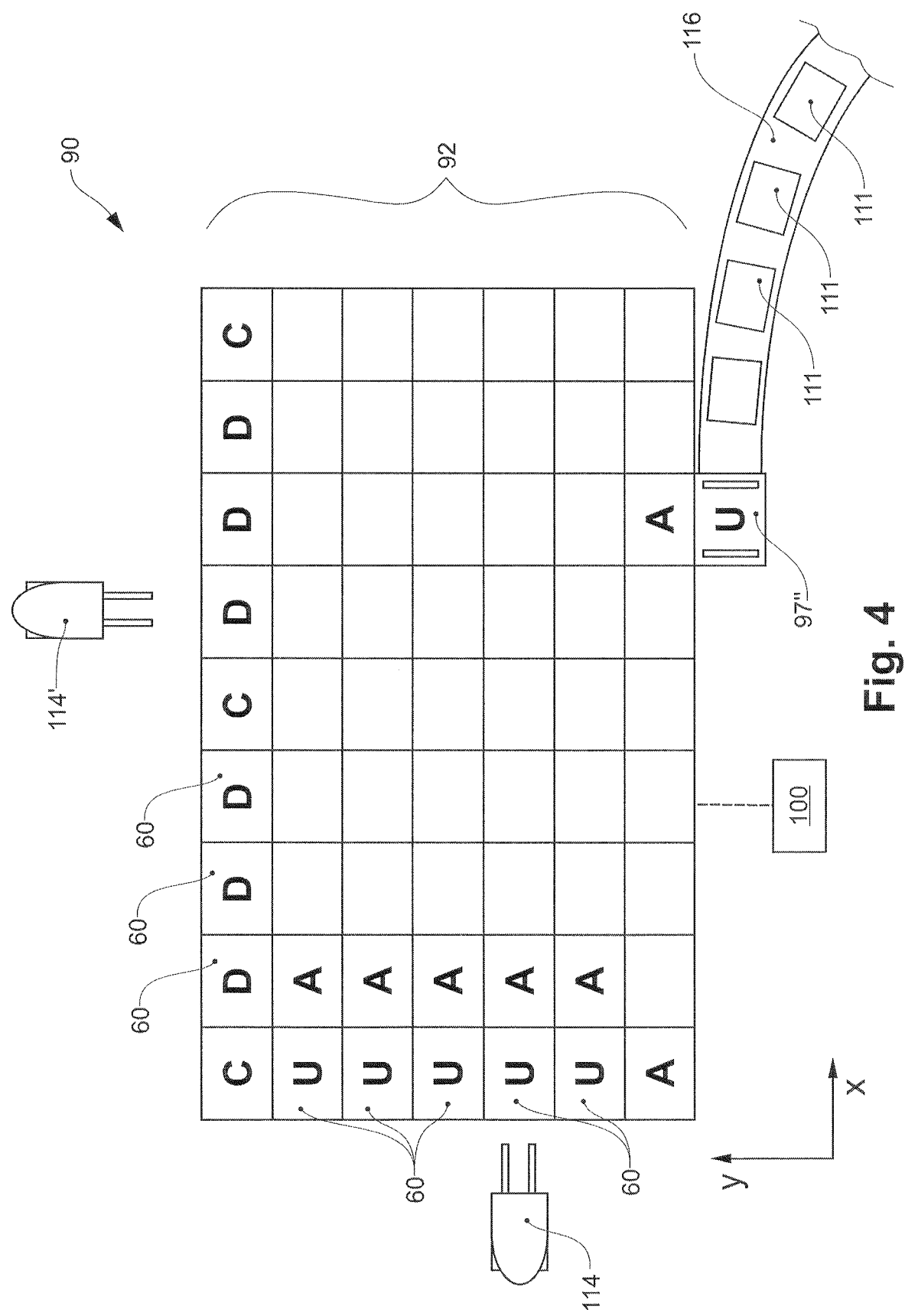
FIG. 4 is a top view of a further embodiment of an installation according to the invention.

FIG. 4 shows such a further advantageous embodiment of a commissioning installation 90 according to the invention, having a commissioning field 92 consisting of 9×7 xy-conveying modules 60. On the left edge of the commissioning field 92, four of the xy-conveying modules 60 are provided as transfer points U. A forklift 114 can now deposit a new unit of goods 111 at one of these four transfer points U on the corresponding conveying module. Thereby, the installation control device 100 can make specifications as to which of the transfer points are to be used, for example by means of appropriate signaling. Alternatively, a transfer can be allowed at any of the transfer points U, which is currently unoccupied. Such a design of a commissioning installation according to the invention has the advantage that the installation control 100 can manage the commissioning field 92 more flexibly, as the transfer points U can also be used for maneuvering the units of goods on the commissioning field 92 if required.

Similarly, at the upper edge of the commissioning field 92, two groups of three xy-modules 60 respectively are provided as output points D, from which units of goods can be removed with a forklift 114' in order to load them into a truck, for example. The division into two groups of removal points offers the advantage that a truck port can be assigned to each group. In this manner, two forklifts can remove units of goods and load them into one truck respectively, without having to cross one another. This increases the operational safety.

In the commissioning installation 90 shown, a y-conveying module 97" is also provided at the lower edge of the commissioning field 92, which receives units of goods 111 supplied by a remote conveying system 116 and transfers them to the commissioning field 92. Such a remote conveying system 116 can, for example, be a device known from prior art for the linear conveying of pallets. The remote conveying system makes it possible, for example, to transfer the units of goods required in a remote storage to the remote conveying system 116 instead of transporting them individually to the commissioning installation 90. Data on the units of goods on the remote conveying system 116 can be considered by the installation control to control the maneuvering procedures, and can be included in the planning simulations, for example.

In the two aforementioned embodiments it was assumed that the units of goods are standardized pallets, particularly EPAL pallets. However, for cost reasons, due to the internationalization of trade and also for regulatory reasons, standard pallets and similar systems are used less and less frequently nowadays. Instead, if necessary, transport carriers are used which are intended for one-time use only and are manufactured at low cost and with low stability. For example, such carriers may only have block-like feet instead of the continuous longitudinal feet of EPAL pallets. The transport carrier can even be made of less stable but inexpensive cardboard members. The low mechanical stability and the variety of shapes makes the automated transport and handling of such units of goods more difficult, particularly conveying with transport modules according to the invention.

This problem can be solved by placing the units of goods on a suitable carrier structure for processing in a commissioning installation according to the invention. In the simplest case, such a carrier structure can be designed as a carrier platform, for example in the form of a rigid metal sheet or a grating. In order to increase static friction, a metal sheet can additionally be provided with a structuring or non-slip surface coating, as known from prior art. Such carrier platforms allow a safe and efficient transport procedure even for very different units of goods. A mixed operation, for example with EPAL pallets and units of goods on carrier platforms, is also possible.

A carrier platform can also be provided with an individual identification. If a unit of goods is deposited on a certain carrier platform and identified thereby, for example by scanning a barcode or similar, the identity of the unit of goods can be assigned to the identity of the carrier platform. The unit of goods can thus be tracked on the path thereof through the commissioning installation. This is also the case with the embodiments of the commissioning installation already discussed. Due to the shifting procedures performed, the installation control knows at any time which unit of goods/pallet is located on which grid field (nominal state). However, an additional identification of the carrier platforms at certain control points, or at most at each conveying module, allows a verification with the actual state. Malfunctions, for example due to faulty functioning of individual conveying modules, can be detected quickly. Furthermore, units of goods that have already been delivered on carrier platforms, for example from a remote conveying system, can be fed into the commissioning installation without having to identify the unit of goods conveyed thereon again.

If a commissioning installation according to the invention is operated with carrier platforms, this can have consequences for the operation and layout of the commissioning installation. In order to deposit a unit of goods on a carrier platform at a transfer point, an unoccupied carrier platform has to be conveyed to this transfer point first. Similarly, after the removal of a unit of goods at a removal point D, the now unoccupied carrier platform has to be moved away again to make space for the next carrier platform to be unloaded. Accordingly, a control device of a commissioning installation in such a case has to organize both the transport of loaded carrier platforms from the input points to the output points and the transport of empty carrier platforms from the output points to the input points.

To increase the number of gaps in the grid field, and therefore the average maneuvering speed, an intermediate storage of temporarily not needed carrier platforms can be provided. For example, a device can be provided which removes unmanned carrier platforms from the commissioning installation and, for example, temporarily stores them in a stack. If necessary, carrier platforms can then be returned to the commissioning installation.

Figure 5:
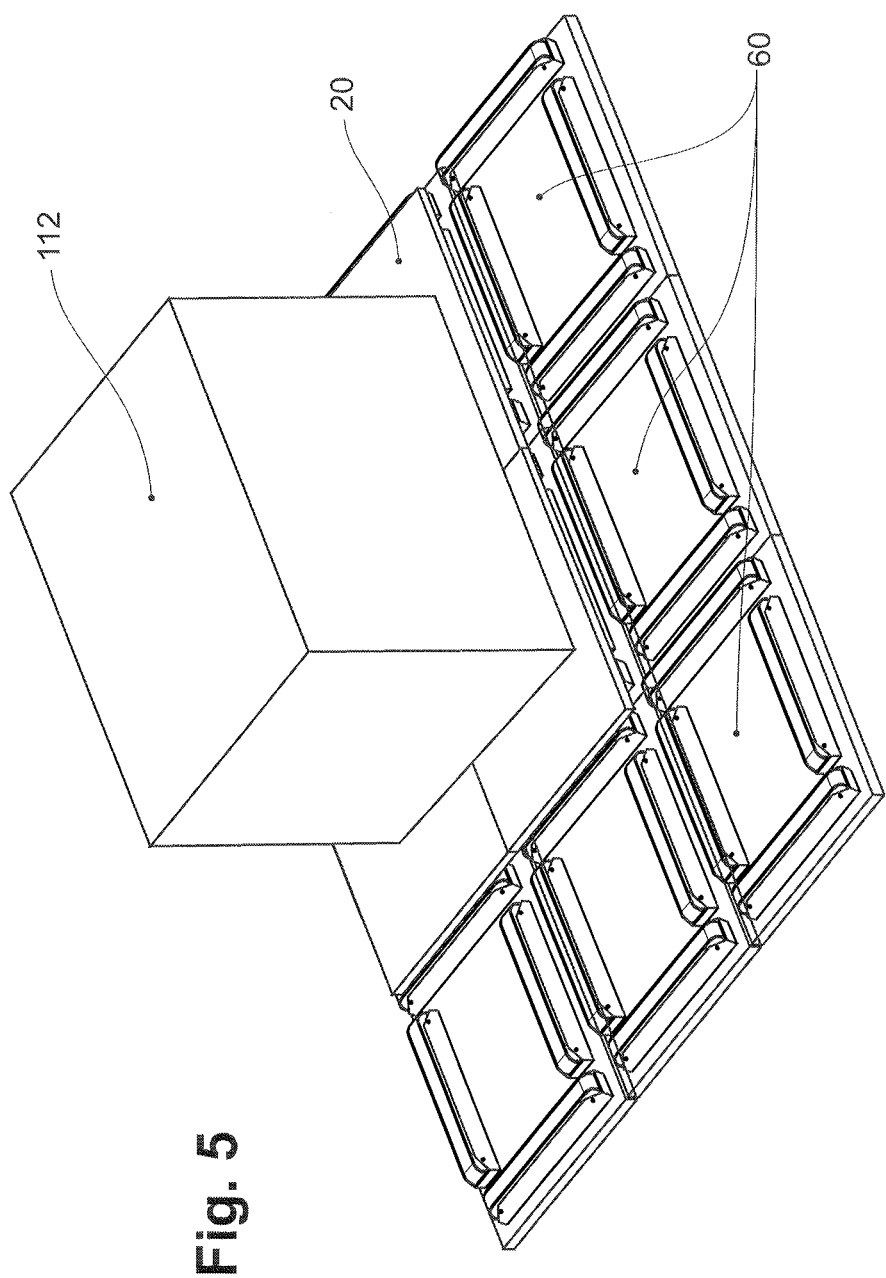
FIG. 5 is a schematic perspective view of a section of a further embodiment of a commissioning system according to the invention.

In the aforementioned examples, the dimensions of a unit of goods or a carrier platform substantially correspond to the dimensions of the conveying modules, in such a manner that one unit of goods can be arranged on each conveying module respectively. Alternatively, it is also possible that in a commissioning installation according to the invention, the length and/or width of a carrier platform is greater than the length and/or width of the conveying modules used. Advantageously, the length and/or width of a carrier platform is a multiple of the length and/or width of the conveying modules used. As an example, FIG. 5 shows a small 3×3 section of a conveying field of an installation according to the invention. The carrier platform 20 covers the surface of 2×2 conveying modules 60. It can be in one piece or consist of four smaller transport platforms coupled together at the abutting edges, as shown in FIG. 5. Such oversized transport platforms can also be used to manage and process goods exceeding the standard size of a commissioning installation, such as the larger machine part 112 shown here schematically.

Figure 6:
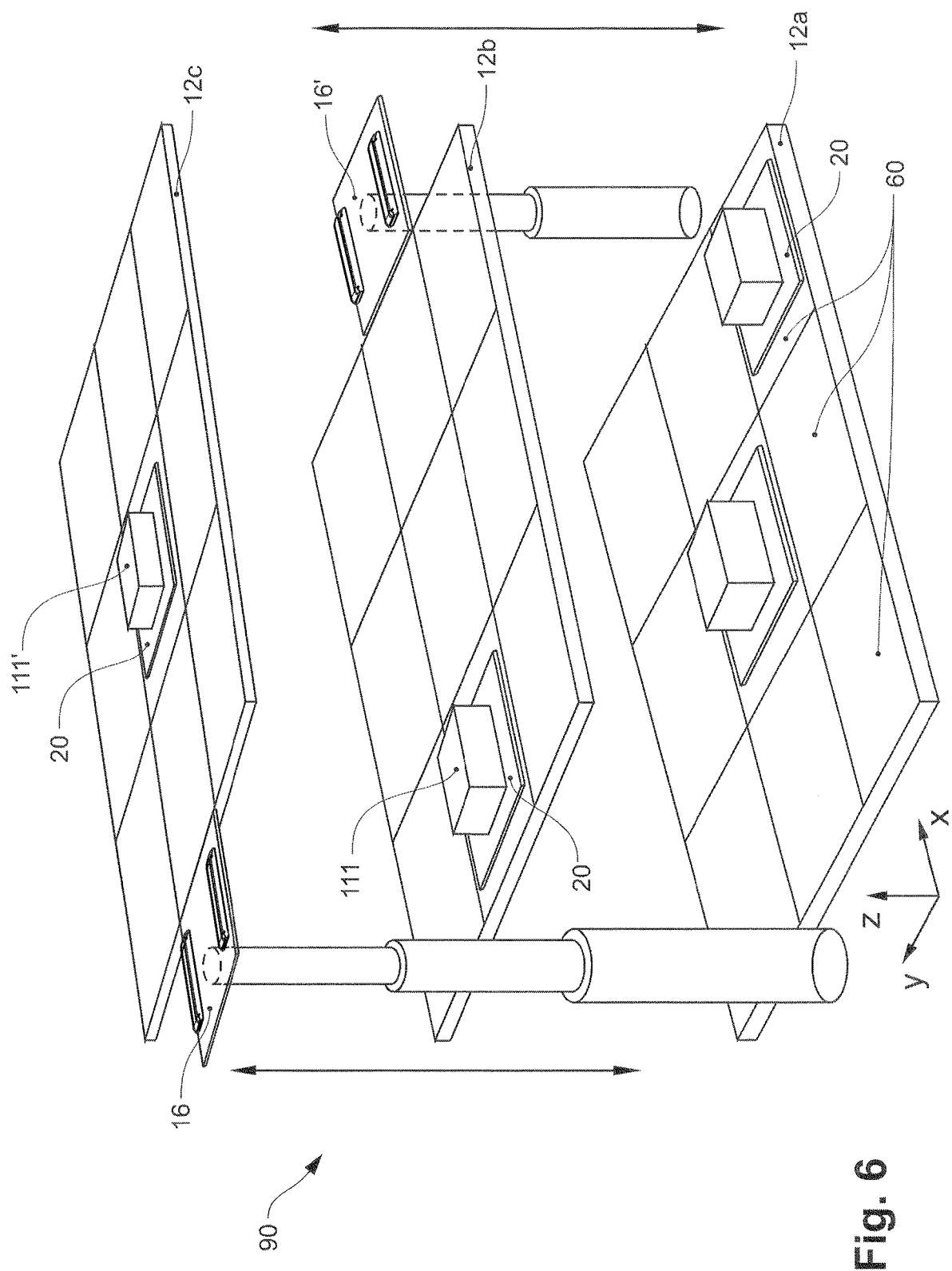
FIG. 6 is a schematic perspective view of a section of an advantageous embodiment of an installation according to the invention having a commissioning field on three planes.

The capacity and/or throughput of a commissioning installation 90 according to the invention can be increased for the same surface usage if two planes are available for the commissioning procedures instead of one. FIG. 6 shows an example of a section of a 3×N commissioning field of a commissioning installation 90 according to the invention, which extends over three planes 12a, 12b, and 12c. The basic structure of the upper planes 12b, 12c is not shown for the sake of clarity. In each case two overlapping planes are connected in pairs by suitable lifting devices 16, 16', with a linear x-conveying module arranged thereon for loading and unloading the lifting device. The lifting device 16 connects the planes 12b and 12, and the lifting device 16' connects the planes 12a and 12b. In FIG. 6, the lifting devices are only shown as examples of schematic telescopic lifting devices.

Figure 7:
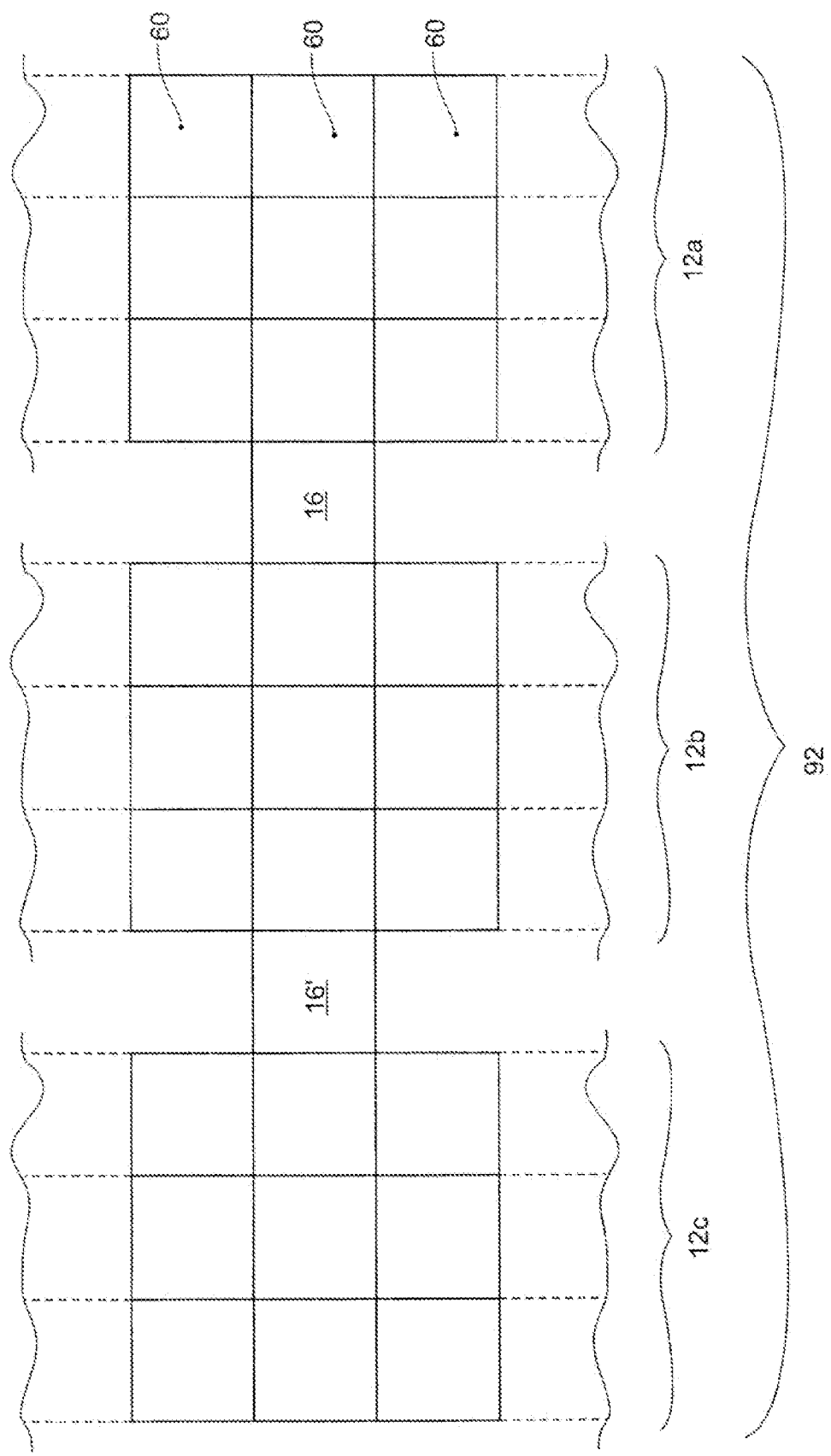
FIG. 7 is a schematic topological representation of the commissioning field from FIG. 6.

Topologically, the commissioning field of FIG. 6 can be displayed in one plane, as shown in FIG. 7. As can be seen, the lifting devices 16, 16' represent narrow places within the entire commissioning field 92, which are to be considered in the planning simulations. Without committing to a specific theory, it can be stated in simple terms that, assuming that the removal points are located in a certain, for example the lowest plane 12a, the aforementioned plane 12a is advantageously used primarily for the provision of commissioning orders to be removed, the second plane 12b primarily for the maneuvering procedures of commissioning, and the third plane 12c primarily for the intermediate storage of empty carrier platforms and of units of goods which are not needed in the short term.

Figure 8:
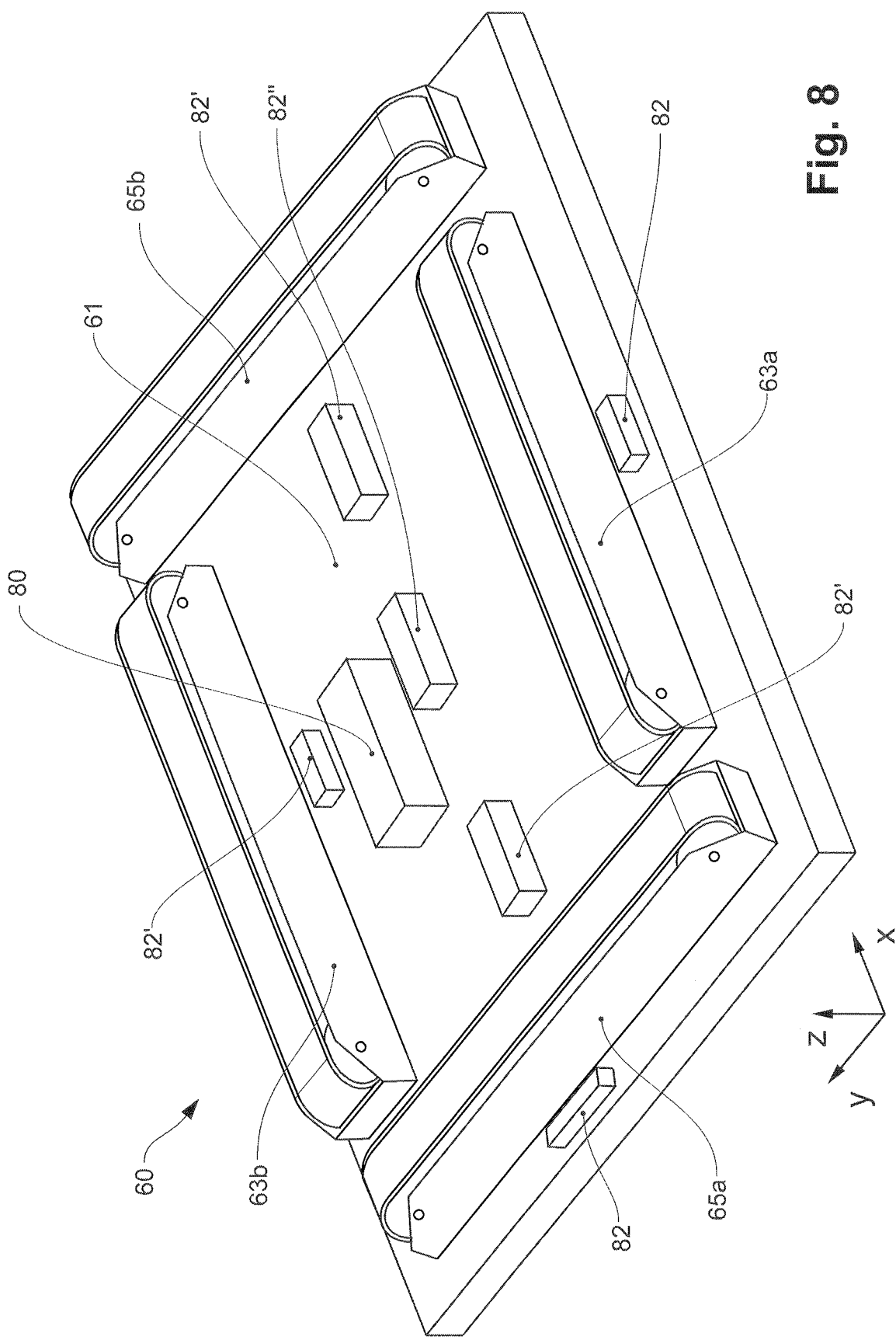
FIG. 8 is a schematic perspective view of an embodiment of an xy-conveying module according to the invention, as it is provided in the devices of FIGS. 1 and 2.

An embodiment of an xy-conveying module 60, as used in the commissioning installations of the previous figures, is shown in FIG. 8 in simplified form.

Four belt conveyors are arranged on a base structure 61 in the form of a base plate. Two belt conveyors 63a, 63b and 65a, 65b respectively are arranged parallel along the outer lateral sides of the base plate 61. In addition to the two drive and tension rollers, the belt conveyors advantageously also have a plurality of carrier rollers which can accommodate the weight of a unit of goods located thereon. Instead of continuous conveying belts, advantageously structured chain conveyor belts can be used.

The use of belt conveyors has particularly the advantage over other conveying means such as roller conveyors that units of goods having only a small resting surface, such as EPAL pallets, can be conveyed.

In FIG. 8 both the belt conveyor pair 63a, 63b along the x-axis and the belt conveyor pair 65a, 65b along the y-axis are in a lowered position. By suitable means (not shown) the two belt conveyor pairs 63a, 63b and 65a, 65b can be raised vertically, independently of one another, separately or simultaneously. For example, the belt conveyors can be raised or lowered by shear mechanisms or eccentric devices. Corresponding lifting mechanisms can be operated, for example, via electric drives, or also pneumatically or hydraulically. The necessary lifting path in the z-direction is comparatively small, since it is only necessary to ensure that a belt conveyor pair in the lowered position no longer has any relevant contact with a carrier platform or unit of goods located on the conveying module 60 when the respective other belt conveyor pair is in the raised position. Short lifting paths are advantageous in relation to the changeover speed.

The effective static frictional force Fx or Fy between a belt conveyor pair 63a, 63b or 65a, 65b and a unit of goods located on the conveying module can serve as a measure of the relevant contact. If, for example, the belt conveyors 65a, 65b are lowered in the y-direction, the weight force acting thereon, and therefore also the static frictional force Fy decrease. If the corresponding surfaces are completely separated, then Fy=0. At the same time, the weight force acting on the belt conveyors 63a, 63b in the y-direction, and therefore the static frictional force Fx, increase. For a selective conveying in x-direction it would be sufficient in principle that Fx>Fy, which is of course always the case with Fy=0. However, with respect to possible sources of error, it is advantageous to select a value of at least 10 for Fx/Fy, or more advantageously Fx/Fy>100. In such a variant, the static friction to the y belt conveyors 65a, 65b is overcome when conveying in x-direction, and the unit of goods slides over the surface of the y belt conveyors. However, a complete separation of unit of goods and inactive belt conveyors, i.e. Fy=0, is most advantageous to avoid wear due to friction. A lifting path of a few millimeters can be sufficient for this purpose with an xy-conveying module in EPAL pallet size.

It is advantageous that no energy is required to keep the belt conveyors in the raised position. This is relevant with respect to energy efficiency, since a conveying module is occupied with a unit of goods for a considerable period of time on average, particularly for applications of such conveying modules in storage systems, which will be discussed below.

A conveying module has the necessary means for connection to a current supply, for example a cable with plug. Advantageously, one to three sockets are also provided on the conveying module, which are directly connected to the current supply and allow the connection of further conveying modules. In this manner, the current supply of all modules can be created tree-like via the modules and the installation of separate current lines is not necessary. The dimensioning of the current lines must be adjusted accordingly. If pneumatic or hydraulic actuators are provided in the conveying module, connections to corresponding compressed air lines or hydraulic lines of a corresponding central fluid supply system may also be provided.

The conveying module 60 further has an own, integrated control device 80, which controls and monitors the conveying direction and the conveying speed of the belt conveyors as well as the lifting and lowering movements of the belt conveyors. An own, integrated control device 80 allows a complete functional modularization of the conveying modules. Alternatively, a part or all of the control functions of a plurality of conveying modules can also be handled by a common control device. A module control device 80 has advantageously at least one microprocessor unit as well as at least one memory unit on which the control programs required for operation and, if necessary, other data can be permanently stored.

In an advantageous variant of the invention, the logistic control, i.e. the determination of the necessary maneuvering movements, is decoupled from the direct hardware control. Based on the calculated maneuvering plan, the installation control determines which conveying modules are to perform which conveying procedure and transmits the necessary control commands to the conveying modules involved in the corresponding conveying procedure. The instructions of the installation control are limited to the procedure itself, without further instructions related to the synchronization of the conveying means involved or other parameters. The hardware control is performed decentrally by the module controls themselves, if necessary in consultation with other module controls. The module controls 80 of the modules involved negotiate and determine the parameters necessary for the concrete, synchronized execution of the conveying procedure directly among themselves, without the participation of the installation control. After the conveying procedure has been completed, the installation control receives a confirmation of execution or an error message from the modules.

A conveying module can further coordinate the operations thereof with those of the adjacent modules thereof. For example, the operation of the belt conveyors in conveying directions can be interrupted if the corresponding belt conveyor pair of the receiving or tributary conveying module transmits an error signal. This may be necessary, for example, if the belt conveyor thereof has a malfunction, or if the receiving conveying module is still occupied by a unit of goods due to an undefined malfunction.

A conveying module can also have a wired or wireless interface to a local data network (LAN, WAN), through which data can be exchanged with the control device 100 of the commissioning installation. Particularly commands can be received from the installation control 100 or status data and error messages of the conveying modules can be passed on thereto.

Instead of a separate local data network, a data network can also be realized by the existing paired data connections of the conveying modules among themselves, which can form such a module network. Thus, for example, a data set can be transferred between a certain conveying module and the installation control via a chain of modules located between these two network points.

Similarly, it is also possible to provide one or a plurality of network node devices which are connected wirelessly or wire-based to a local data network to which the installation control is also connected. These network node devices are in turn connected to the module network in such a manner that the conveying modules can communicate with the local data network. Such network node devices may also be provided as a standard component of a conveying module, wherein only a part of the conveying modules may have the network node device activated.

The conveying module 60 further comprises a plurality of sensor devices 82, 82', 82", which are operatively connected to the module control 80. The design of the sensor devices can vary depending on the intended use. In the embodiment shown, four sensors 82 are arranged in the middle of the four outer edges of the base plate 61, wherein only two of the sensors are visible in FIG. 8. The sensors 82 are designed as reflection sensors which can detect the passing of a unit of goods. The corresponding information can be used by the module control 80 for continuous function control. Alternatively, induction sensors or other, advantageously non-contact sensors can be used. Induction sensors are particularly suitable for carrier platforms made of metal, and are less susceptible to interference than optical sensors, for example.

A sensor device 82" is located in the center of the base plate 61. The sensor devices 82" are provided to read RFIDs or optical codes, for example barcodes or 2D codes, which are arranged on the underside of a carrier platform for the unique identification thereof. The module control can then compare the corresponding identification data for function control with a target value, for example with information provided by the installation control 100 about the carrier platform to be expected next. Alternatively, the identification data can also be transmitted to the installation control as an actual value for cross-checking. Four additional sensor devices 82' are located in the inner area of the base plate 61 defined by the belt conveyors 63a, 65a, 63b, 65b, wherein only three of the aforementioned sensors are visible in FIG. 8. The sensor devices 82' are provided to read suitable optical markings which are arranged on the underside of a carrier platform at a certain position and/or in a certain orientation. The module control can then use this information to determine the orientation of the carrier platform on the conveying module. If this is not within a certain area, for example if the carrier platform is twisted or not centered on the conveying module, the module can send a corresponding status message to the installation control. Alternatively or additionally, the module control can correct the position by activating one or a plurality of the four belt conveyors 63a, 63b, 65a, 65b to rotate and/or transversely shift the carrier platform. Thus, for example, a rotation of the carrier platform can be achieved by a counter-directional conveying direction of the belt conveyors of one or both belt conveyor pairs.

It is also advantageous for a conveying module according to the invention to have means for height adjustment and alignment in the horizontal, for example height-adjustable feet. Appropriate measuring means, such as a circular level or a circular spirit level, may be provided to assess the correct horizontal alignment.

The various phases of a method for position correction of a unit of goods on a grid field 31 of xy-conveying modules 60 is shown in FIG. 15 in plan view of a section of the grid field. A unit of goods 111, for example a pallet, is located on an xy-conveying module 60 (FIG. 15a). The alignment of the unit of goods 111 is not parallel to the edges of the conveying modules for an undefined reason. One reason for such a misalignment can be, for example, a slightly twisted alignment when depositing the pallet on the module with a forklift. In practice, the tilt angle of a unit of goods 111 relative to the coordinate system of the grid will be smaller than in the example in FIG. 15a, which is highly tilted for better visualization.

Figure 9:
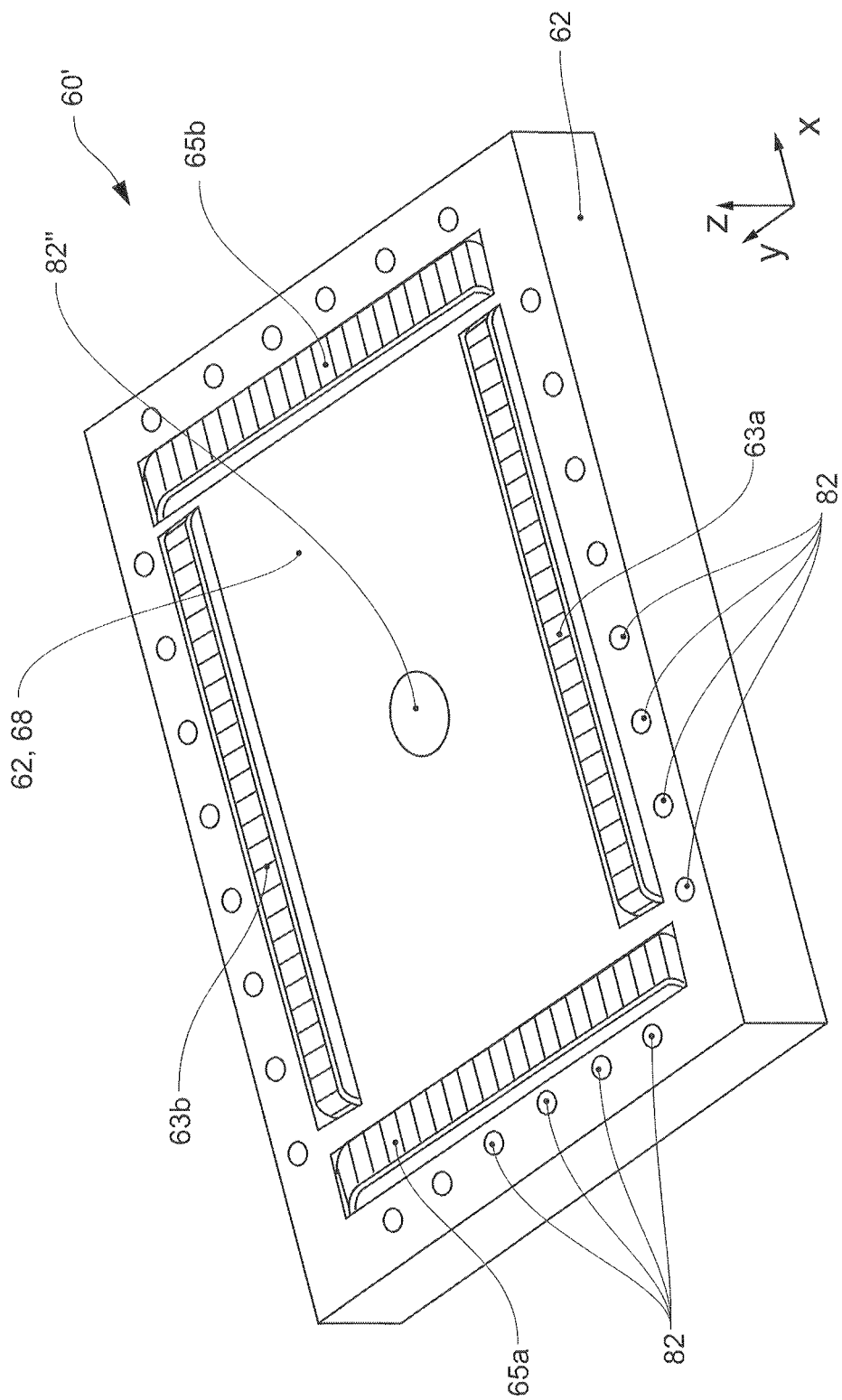
FIG. 9 is a schematic perspective view of another embodiment of an xy-conveying module according to the invention.

The module units 60, 60', 60" of the grid field 31, which are only schematically shown, substantially correspond to a conveying module as shown in FIG. 9 below. The conveying modules have two belt conveyors 63a, 63b and 65a, 65b along both axes x, y. A plurality of sensors are arranged along the four outer edges of a conveying module in a sensor array 82, which can detect the passing of an outer edge of a rectangular unit of goods.

When the rectangular unit of goods 111 is moved along the x-axis from a first conveying module 60 to a second conveying module 60' (FIG. 15a to FIG. 15b), a leading edge 117 of the unit of goods in the conveying direction passes the facing sensor array 82 of the next conveying module 60'. An angle between the detected edge of the unit of goods and the axis of the sensor array 82 can be determined from a time difference of the detected signals of the individual sensors of the sensor array 82 in connection with the conveying speed of the belt conveyors 63a, 63b. This angle corresponds to a tilt angle α of the rectangular unit of goods in relation to the xy-coordinate system of the raster field, where ideally α=0°. Alternatively or additionally, the trailing edge 118 of the unit of goods, which is at the rear in the conveying direction, can also be detected.

When the unit of goods 111 has now reached the target position on the second conveying module 60' (FIG. 15c), the rotary alignment of the unit of goods can be corrected. For this purpose, the belt conveyors 63a, 63b, 65a, 65b of the conveying module 60' are actuated in a suitable manner to achieve a rotation of the unit of goods 111 against tilting. For example, the unit of goods may be stored on one pair 63a, 63b or 65a, 65b of belt conveyors, while the other pair is lowered. Due to a difference in the conveying speed of the two active belt conveyors, in analogy to vehicles with chain drive, a rotation of the unit of goods stored thereon is performed. For example, the rotational directions of the belt conveyors may be opposite to one another, or one of the two belt conveyors may be blocked. A control unit of the conveying module determines the necessary parameters (conveying direction, speed, duration) of the belt conveyors in order to correct the tilt of the unit of goods, i.e. to reduce the tilt angle to zero (FIG. 15d), and controls the belt conveyors accordingly.

It is also possible to operate all four belt conveyors 63a, 63b, 65a, 65b simultaneously in order to achieve a rotation of the unit of goods.

Furthermore, it is possible to cause a rotation from one conveying module 60 to the other conveying module 60' already during the transverse conveying by setting a certain difference for the conveying speeds of the participating belt conveyors of one or both conveying modules during the transverse conveying. In this manner, in addition to the translatory movement of the unit of goods, an overlapping rotational movement is also achieved.

The correct alignment or a remaining tilt angle of the unit of goods can be determined when subsequently passing the sensor array of a third conveying module 60". Alternatively, the unit of goods can be advanced and retracted over a short distance via a sensor array to check the alignment.

It is also possible to observe the underside of the unit of goods during the rotation procedure by means of one or a plurality of upwards-facing camera systems arranged in the middle of the conveying module. With suitable image processing algorithms, the actual translational and rotational movement of the unit of goods can then be determined from the shifting of the structures of the underside of the unit of goods in relation to the camera. In this manner, the control of the conveying means can be adapted during the rotation procedure in the sense of feedback. Corresponding sensors, digital signal processing chips and algorithms are known from the application in optical mouse.

Continuous correction of deviations of the alignment of units of goods from the xy-coordinate system of the grid field makes it possible to minimize the spatial dimensioning of the xy-conveying modules as far as possible, since less protruding edge of the conveying module is required as a reserve to avoid contact of incorrectly aligned units of goods on adjacent conveying modules. In the maximum case, the base surface of a conveying module can thus be reduced to the spatial dimensions of the largest type of goods that can be conveyed, thus maximizing the receiving capacity of a commissioning installation per surface unit.

Similarly, the movement of a unit of goods can be observed during the conveying procedure using the aforementioned means and methods. In this manner, a deviation from the intended translatory movement of the unit of goods can be detected during the conveying procedure, or even corrected during the conveying procedure.

In a conveying module according to the invention, which is to be used in the method described above, a difference in conveying speed is to be adjustable for the conveying members of a pair of interacting conveying members, i.e. for example the individual belt conveyors of a parallel belt conveyors pair. This can be achieved, for example, by separate drives of the individual belt conveyors, which can be controlled separately. Alternatively, adjustable transmission gears can be used, wherein such a solution is less advantageous despite the reduction to only one common drive due to the higher mechanical complexity.

In an alternative embodiment of a conveying module according to the invention, means can be provided to change the alignment of the entire conveying module or at least the conveying members, i.e. the belt conveyor pair, by a certain angle in relation to the xy-coordinate system. For example, the basic structure of the conveying module can be stored on a second basic structure in such a manner that it can be rotated or pivoted about a vertical axis, in such a manner that by rotating or pivoting the first basic structure by a certain angle, the belt conveyors of the conveying module and any unit of goods located thereon can also be tilted by this angle relative to the coordinate system of the grid field. With such a conveying module, a tilt angle of a unit of goods can be corrected during transfer to the next conveying module. To enable a rotational movement of the upper, first basic structure on the second, lower basic structure, slide bearings or roller bearings can be provided, for example. For correction of minor misalignments, a maximum pivoting angle of a few degrees is sufficient, for example 10° or 5°.

Besides the correction of misalignments of units of goods in relation to the coordinate system of a grid system, the advantageous conveying modules discussed above also make it possible to compensate for minor irregularities in a grid field. For example, it may be necessary for geometrical reasons to arrange the conveying modules of a grid field with slight deviations from a perfectly rectangular coordinate system, for example to better integrate non-removable small obstacles into the grid field, or to consider unusual spatial shapes. With the aid of the described alignment correction of the conveying modules, it can thus be ensured that the units of goods are correctly aligned at all times in relation to the local conveying modules.

A further advantage of such an alignment correction are applications in which the conveying modules are temporarily assembled into a grid field in a short time and under improvised conditions, without the modules having to be perfectly aligned. As an example, improvised logistic facilities can be mentioned here, for example in the area of military logistics (e.g. airfields), but also logistic applications in disaster relief operations.

Another embodiment of an xy-conveying module 60' according to the invention is shown in FIG. 9. The conveying module 60' has a housing 62, the upper side of which forms a carrier structure in the form of a deposit surface 68. The carrier structure 68 is supported on the base structure 61 and can accommodate the weight of a unit of goods placed thereon. The deposit surface of the carrier structure can be designed to have a particularly high or low friction. For example, a plate made of HDPE or PTFE may be attached to the upper side of the housing (low friction), or have a rough structure or an elastomer coating (high friction).

The belt conveyors 63a, 63b, 65a, 65b can be raised above the level of the carrier structure 68 to an upper position through corresponding gaps in the housing 62 or the carrier structure 68 and thus lift a unit of goods from the carrier structure 68 for a conveying procedure. The inactive belt conveyors can remain at the level of the carrier structure or be lowered below it to a lower position. Alternatively or additionally, the carrier structure 68 can be lowered together with the passive belt conveyor pair while the active belt conveyor pair remains in position or is raised.

A sensor device 82" in the middle of the carrier structure 68 in turn allows the reading of an identification of a carrier platform. Along the outer edges of the housing 62, rows of sensor devices 82 are provided which can detect the passing of the edge of a carrier platform. In an advantageous variant, a certain orientation of the carrier platform can be determined from the temporal offset of the signals of the individual sensors. If the passing of the edge of a rectangular carrier platform is detected by all sensors simultaneously, the carrier platform is aligned parallel to the conveying direction. If the edge passes the sensors with a time delay, the carrier platform is twisted, wherein a twisting angle of the carrier platform can be determined from the time intervals of the detection signals, the distance between the sensors and the conveying speed.

Figure 10A:
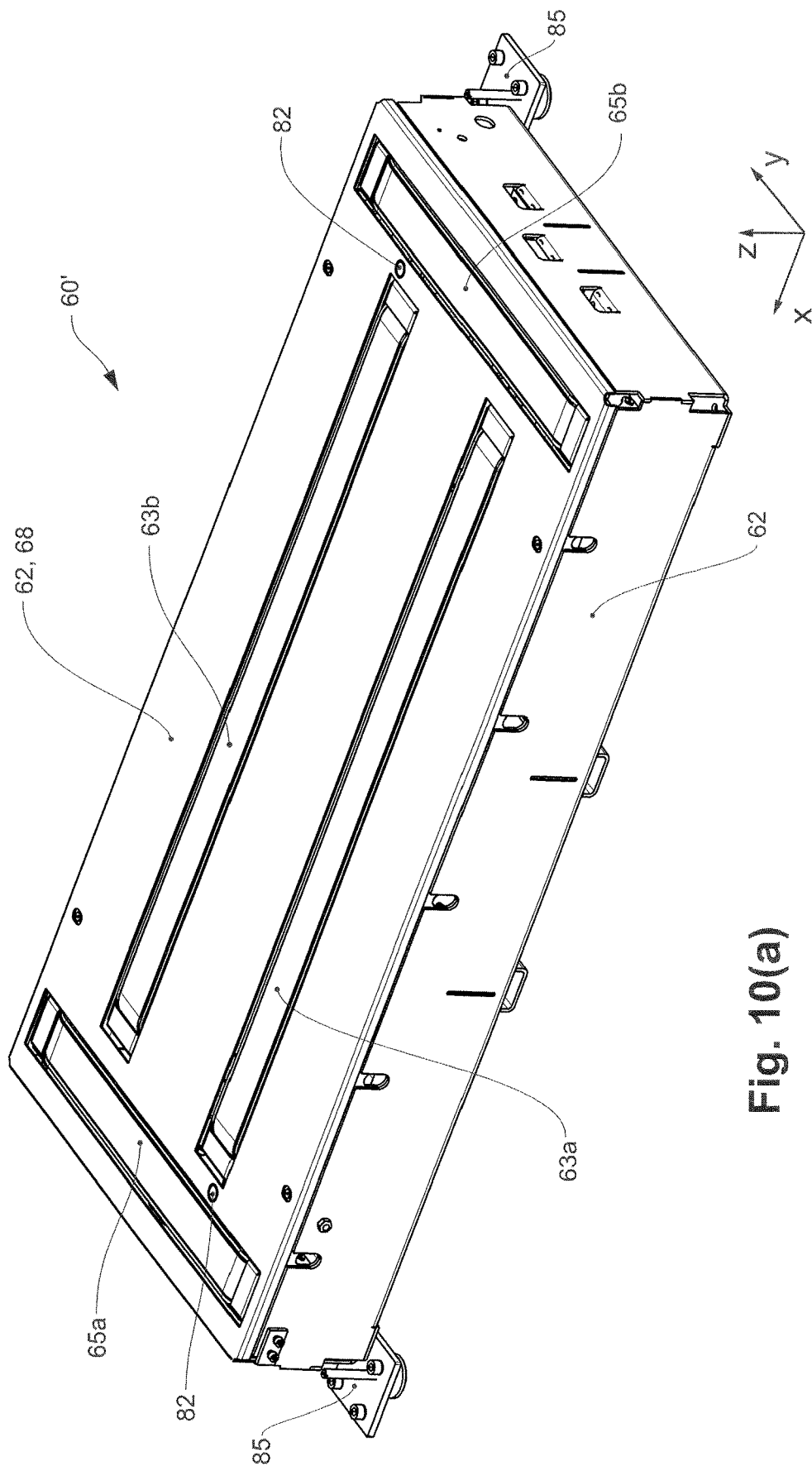
FIG. 10(a) is a schematic further embodiment of an xy-conveying module according to the invention, in perspective view.
Figure 10B:
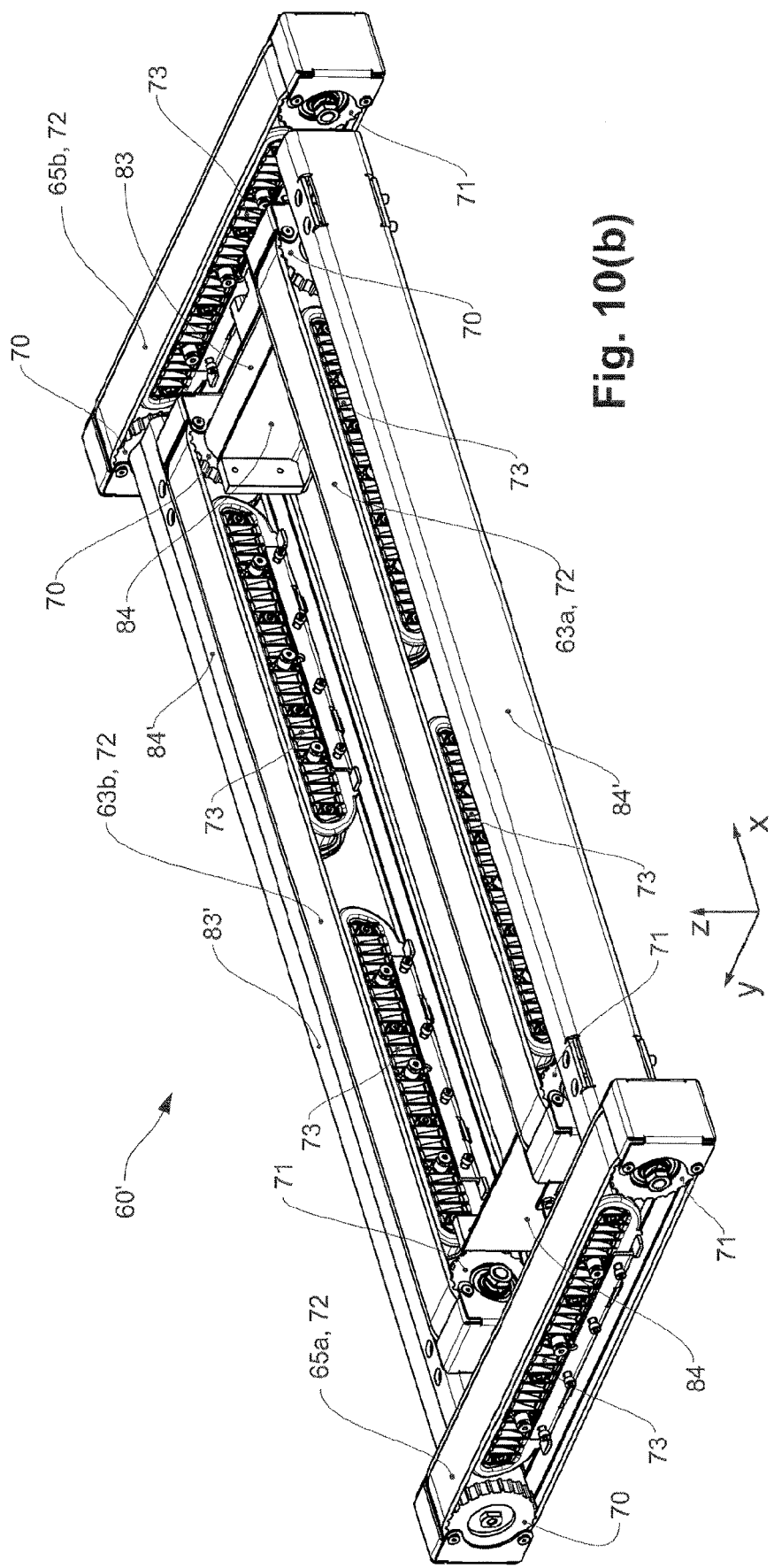
FIG. 10(b) is a schematic further embodiment of an xy-conveying module according to the invention in another perspective view without housing and basic structure.

A further advantageous embodiment of an xy-conveying module 60' according to the invention is shown in FIG. 10, with and without cladding 62. Also in this variant of a conveying module 60', the upper side of the housing 62 forms a carrier structure in the form of a deposit surface 68. This is supported on the basic structure of the module. The deposit surface is designed in such a manner that a unit of goods can be deposited thereon.

The basic structure of the conveying module, located inside the housing and not shown in the figures, is assembled on assembling members 85 not belonging to the conveying module, of which two assembling members are shown in FIG. 10(*a*) as an example. The assembling members are arranged in a grid-type manner on a superordinate basic structure or on the base. Four respective adjacent conveying modules, abutting at the corners, rest on one assembling member. A vertical pin located in the middle of the assembling members 85 allows the assembling of a three rotating guide roller (not shown) having a vertical rotational axis. If a plurality of such conveying modules according to the invention are arranged in a grid-type manner in such a manner as to be flush with one another, a guide roller respectively can be arranged between the abutting corners of the four conveying modules. When conveying a unit of goods from one conveying module to an adjacent conveying module, the unit of goods is then passed through between two guide rollers. The dimensioning of the conveying modules and the guide rollers is advantageously selected in such a manner that the guide rollers do not usually come into contact with the units of goods. If, however, a unit of goods or a carrier platform is twisted for any reason in relation to the conveying grid, then the unit of goods or the carrier platform is partially or completely aligned with the grid again during conveying from one conveying module to the other by the two guide rollers between the modules.

If the aforementioned guide rollers are freely rotatingly stored, they act as passive correction devices for alignment errors of units of goods, which at least partially press a unit of goods that has been pivoted in relation to the grid field coordinate system in the direction of the correct position during the passage. As an alternative to freely rotating rollers, vertical permanently assembled bars, posts, rails or plates can also be used, wherein in such a case it is advantageous to have as smooth a surface as possible in order to minimize the risk of units of goods passing through being caught.

It is also possible to actively drive the aforementioned guide rollers and thus operate them as active correction devices.

Guide rollers can be used both as passive corrective devices and as active corrective devices as an alternative or in addition to active corrective devices as discussed above in connection with FIG. 15.

The conveying module 60' shown has two sensor devices 82, which enable the detection of units of goods. The sensor devices are arranged in such a manner that the same sensor can detect both a passage in x-direction and a passage in y-direction. The sensor devices can in turn be designed as optical sensors or induction sensors.

The belt conveyors 63a, 63b, 65a, 65b can be raised above the level of the carrier structure 68 through corresponding gaps in the housing 62 as in the previous embodiment. In the passive status, the belt conveyors remain at or below the plane of the carrier structure 68. Accordingly, a unit of goods or a carrier platform always rests on the belt conveyor pair that is conveying. If no conveying is performed, it is advantageous for both belt conveyor pairs to remain in the lowered position, in such a manner that the weight of the unit of goods only rests on the carrier structure.

The design of belt conveyors 63a, 63b, 65a, 65b is shown in FIG. 10(a). The two y belt conveyors 65a, 65b are stably connected to one another by two connecting members 84' in the form of cross carriers arranged in the x-direction. In the inner space of the rectangular structure formed by the belt conveyors 65a, 65b and connecting structures 84', the x-belt conveyors 63a, 63b are arranged, which are also connected by two connecting members 84 in the form of a U-shaped sheet, and form a common rectangular structure.

The two belt conveyor pairs, or their respective structures, can be raised independently of one another from a lower, passive position to an upper, active position. For this purpose, a structure having four rollers respectively is stored in a guide slot having four ramp-shaped ascending guide grooves (not shown), in such a manner that a transverse shift of the structure generates a vertical lifting movement. For a shift to the upper, active position, an actuator moves the structure in a transverse direction and simultaneously pushes it up the ramps of the guide links. The belt conveyor pair is lifted. The own weight of the structure is sufficient for lowering it back to the lower, passive position.

In the embodiment shown, the two belt conveyors of one conveying direction are respectively driven by a common drive device 83, 83' in the form of an electric motor. The electric motor arranged in a cylindrical housing is directly coupled on both lateral sides to the respective drive gear 70 of the belt conveyor, which drives an elastically pretensioned toothed strap conveying belt 72. A counter gear 71 is arranged at the end of the circulating conveying belt opposite the drive gear 70. The toothed strap conveying belt 72 has on the inner surface thereof a centrally arranged running surface and two toothed strap structures arranged at the edges, with which the drive gear 70 comprising two spaced toothed discs interacts. The inner running surfaces of the conveying belts 72 rest on one or two roller arrangements on the load side, which respectively form an anti-friction bearing 73. The roller arrangements/anti-friction bearings 73 comprise an inner running surface, a cage in the form of a rotating, closed flexible chain which rotates about the inner running surface, and a plurality of anti-friction rollers which are attached in the cage so as to rotate freely. The inner running surface of the anti-friction bearing rests on a certain section facing the conveying belt parallel to the conveying belt 72. Therefore, on this section, the running surface of the conveying belt rests in rolling contact with the rolling bodies of the anti-friction bearing 73, and these in turn rest in rolling contact with the inner running surface of the anti-friction bearing. Accordingly, the weight-loaded conveying belt only has to overcome the rolling resistance, and at the same time is evenly supported by the large number of anti-friction rollers.

In an advantageous variant of such a conveying module according to the invention, passive guiding members can be provided along the outer edges of the conveying module, which are movable between an upper position, in which they project above the plane of the active conveying means, and a lower position, in which they do not project above the plane of the active conveying means. Such guiding members can be designed as guide sheets or guide rails, for example, which positively prevent the unit of goods from deviating from the intended conveying direction during the conveying procedure. An example of such an embodiment is shown in FIG. 16, (a) in a raised position of the guide sheet, and (b) in a lowered position of the guide sheet.

Figure 16A:
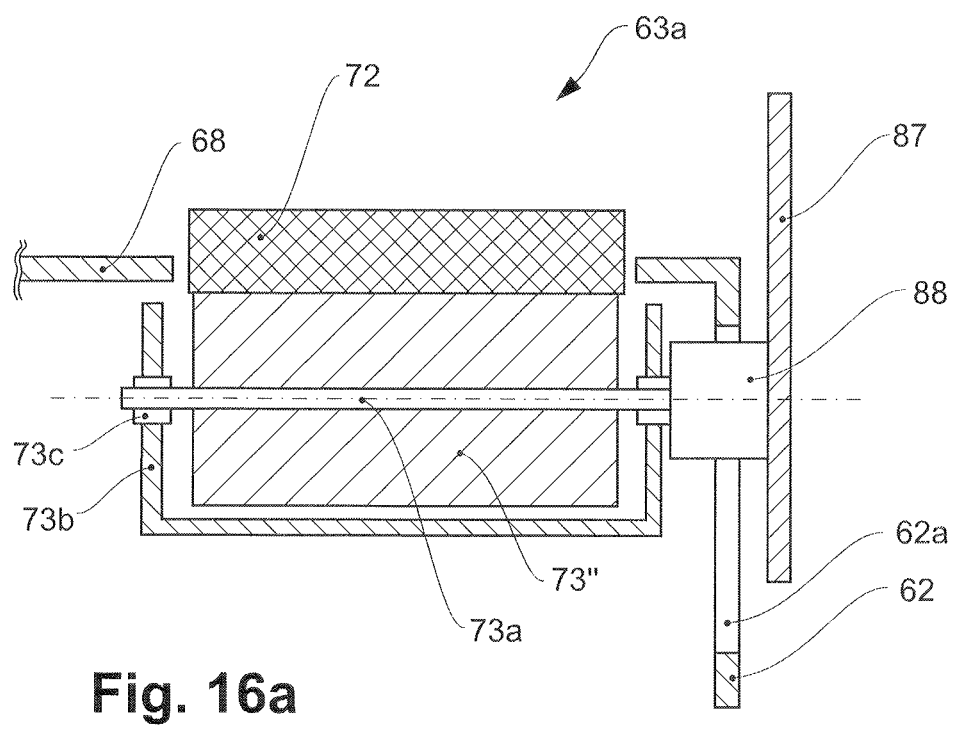
FIG. 16(a) is a schematic cross-sectional view of an advantageous embodiment of a conveying module having guide sheets in a raised position of the guide sheet.
Figure 16B:
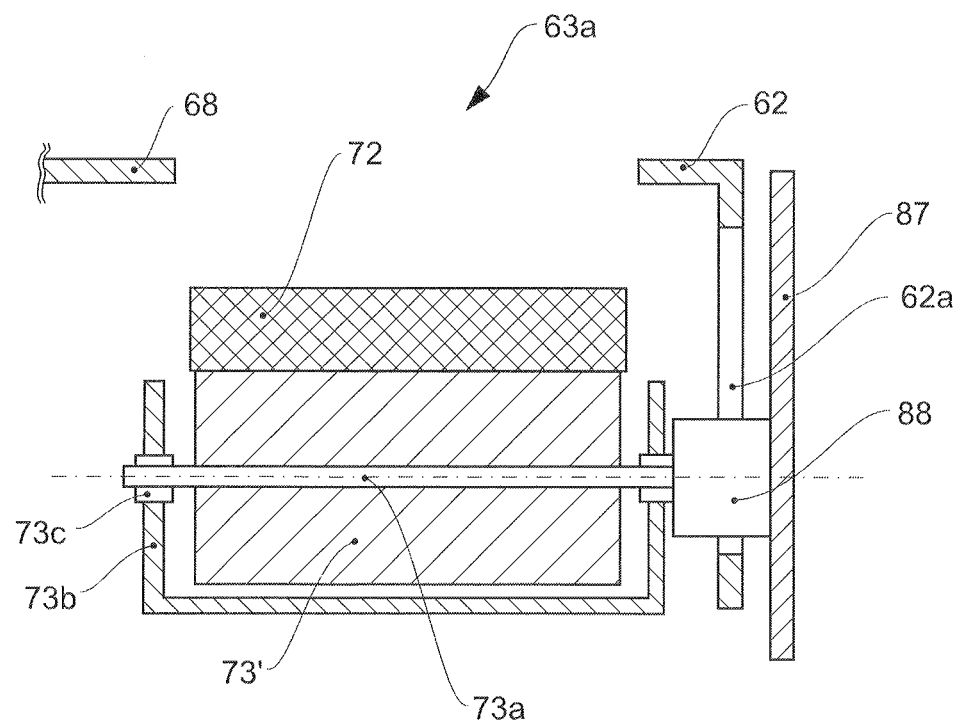
FIG. 16(b) is a schematic cross-sectional view of an advantageous embodiment of a conveying module having guide sheets in a lowered position of the guide sheet.

The shown schematic cross-section shows a belt conveyor 63a and the outer edge of a conveying module. The conveying belt 72 rests on a support roller 73', the axis 73a of which is rotatably mounted in a rotating storage 73c of a roller carrying structure 73b. In the raised state as shown in FIG. 16a, the conveying belt rests above the plane of a carrier structure 68 of the conveying module, and is therefore operational. The belt conveyor 63a can convey a unit of goods (not shown) in x-direction (perpendicular to the cutting plane). In the lowered state as shown in FIG. 16b, the plane of the conveying belt 72 is below the deposit surface 68, in such a manner that the unit of goods either rests on the carrier structure or on the y-belt conveyor in the y-direction (not shown).

A connecting plate 88 is assembled on the roller carrying structure 73b, which is arranged in a vertical slot or an elongated hole 62a in the outer wall of the cladding 62. The slot-shaped recess 62a allows the connecting plate 88 to be shifted vertically.

A guide sheet 87 is assembled on the connecting plate outside the cladding. At least two connecting plates 88 which are spaced apart along the outer edge of the conveying module are provided for a stable attachment of the guide sheet 87 in relation to the belt conveyor.

In the upper position of the belt conveyor 63a (FIG. 16a) the guide sheet 87 is also in an upper position and protrudes above the plane of the operative belt conveyor 63a. The guide sheet 87 keeps the unit of goods on track when conveying in x-direction and prevents deflection of the unit of goods in y-direction. In the lower position (FIG. 16b), the guide sheet 87 is located below the plane of the carrying structure 68, and therefore does not prevent the unit of goods from being conveyed in the y-direction.

Basically it is sufficient if the guide sheet is in the lower position below the plane of the belt conveyor ready for conveying. The distance between the lower and upper position can therefore be shorter than in the embodiment discussed.

Additionally, means for lateral support of the guide sheets can be advantageously provided in order to divert the forces acting sideways on the guide sheets from the guide sheet to the basic structure of the conveying module instead of to the belt conveyor carrying the guide sheet. For this purpose, for example, guide rods connected to the basic structure and aligned with the direction of displacement of the guide sheet can be provided on which the guide sheet is slidably stored.

Alternatively or additionally the guiding members can also be provided having a plurality of rollers that can be rotated about the vertical to reduce the sliding resistance of the guiding members. The rollers can be designed to rotate freely or be actively driven. It is also possible to use a vertically arranged conveying belt as a guiding member, which can be freely movable passively or actively driven.

Advantageously, the movement of the guiding members is directly coupled to the movement of the corresponding parallel conveying members, as shown in FIG. 16. When a belt conveyor is raised or lowered, simple means can be used to ensure that the corresponding guiding member is also in the correct position. Furthermore, there is no need for additional drive and control means for the guiding members.

Figure 11:
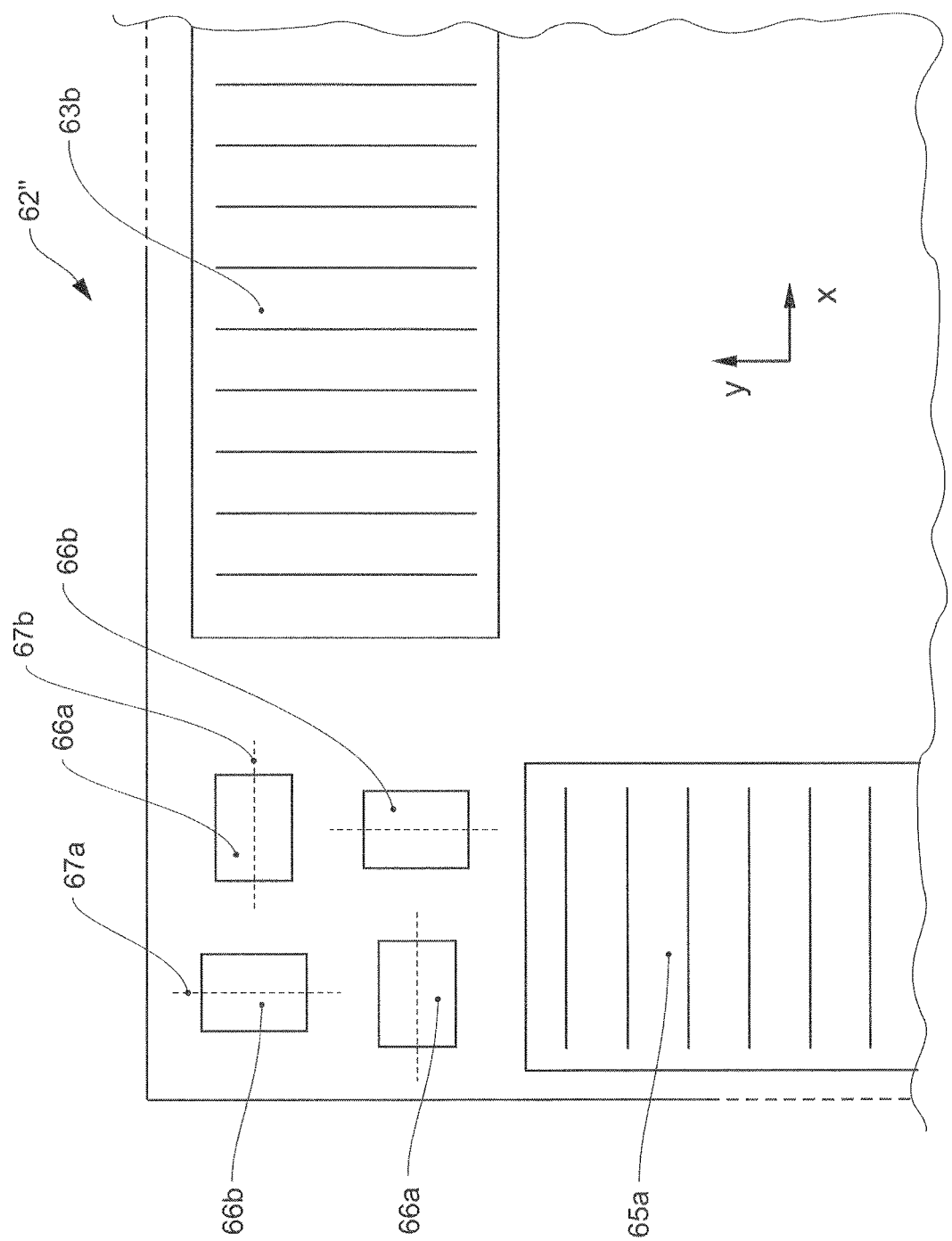
FIG. 11 is a schematic view of a detail of another embodiment of an xy-conveying module according to the invention.

A detailed view of the corner of a further variant of an xy-conveying module 60" according to the invention is shown in FIG. 11. The belt conveyors 63b in x-direction and 65a in y-direction are arranged in such a manner that the corner of the conveying module 60" remains free. Four freely rotating, horizontal support rollers 66*a*, 66*b* are arranged in each corner of the conveying module 60", wherein in the case of the two rollers 66*a* the rotational axis 76*a* is parallel to the x-axis, and in the case of the two rollers 66*b* the rotational axis 67*b* is parallel to the y-axis. The rotating roller pairs 66*a* or 66*b* are respectively lifted and lowered together with the corresponding belt conveyor pairs 63*a*, 63*b* or 65*a*, 65*b*. The rollers, which are not driven themselves, are used to support the units of goods or the carrier platforms in the corners of the conveying units, in such a manner that the support is ensured in both conveying directions over the entire length of the conveying module.

Figure 12:
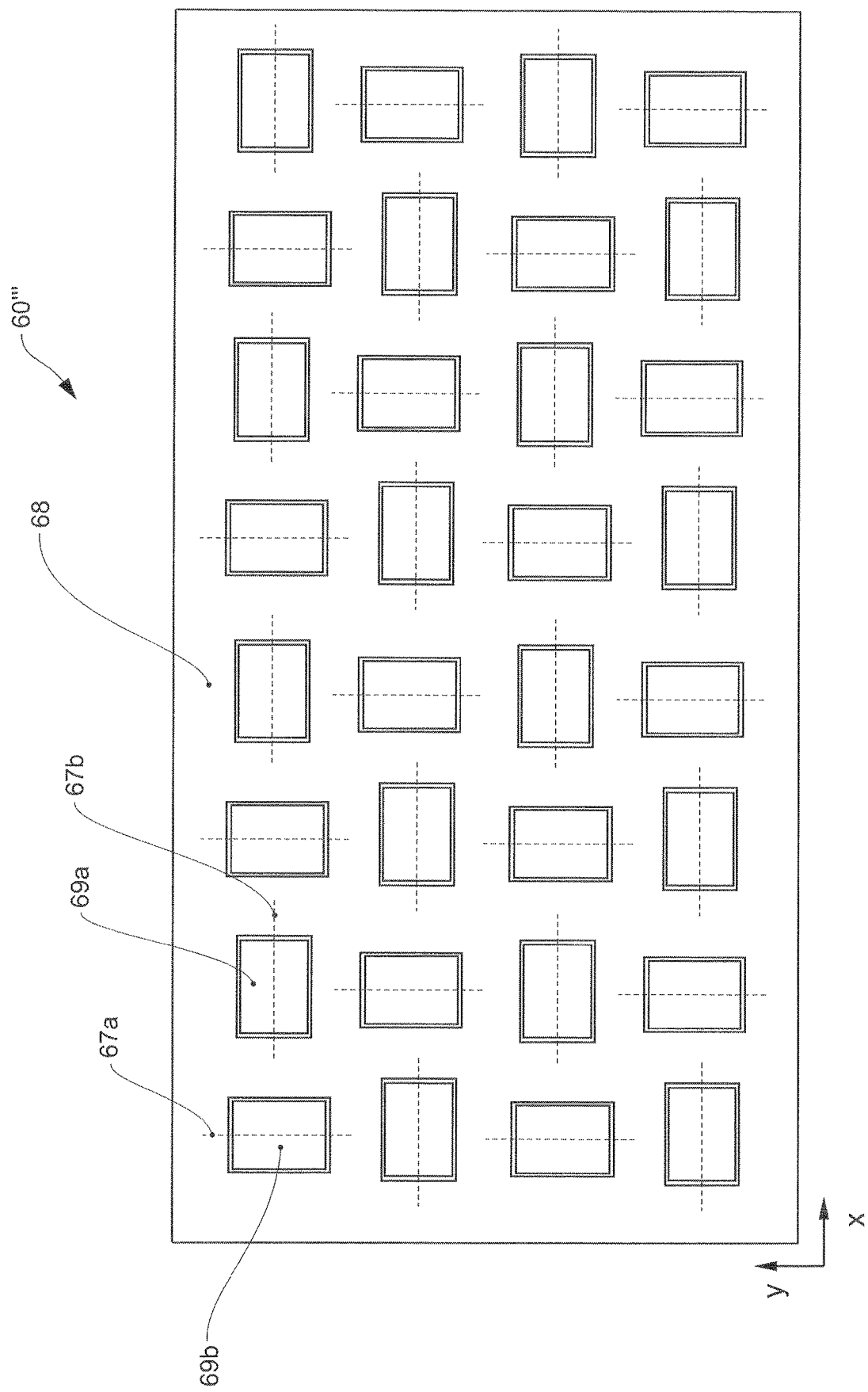
FIG. 12 is a schematic view of yet a further embodiment of an xy-conveying module according to the invention.

Instead of using belt conveyors as in the previous embodiment, an xy-conveying module according to the invention can also be realized with other conveying means. FIG. 12 shows such a variant of an xy-conveying module 60''' according to the invention, which is realized with roller conveyors. Two groups of driven, horizontal conveying rollers 69*a* or 69*b*, having a rotational axis 67*a* parallel to the x-axis or a rotational axis 67*b* parallel to the y-axis, respectively, are arranged on a grid alternately distributed on the conveying module 60". The conveyor rollers 69*a* or 69*b* having a parallel rotational axis 67*a* or 67*b* together form one of two roller conveyors respectively in x-direction and y-direction. The rollers of the roller conveyor that are not needed are lowered in vertical direction and/or the rollers of the active roller conveyor are raised. A carrier structure in the form of a plate 68 has gaps through which the rollers partially extend in the upper position.

The modularization of the conveying modules according to the invention makes it possible to efficiently and quickly establish a commissioning installation according to the invention without the costly preparation of a larger basic infrastructure. The installation can be extended, reduced or modified or dismantled as required, if necessary even during operation. The conveying modules can be easily transported. Accordingly, such conveying modules are also suitable for the creation of commissioning installations for shorter operations or under improvised conditions, for example for large construction sites, in the area of military logistics, or for relief operations in crisis zones, etc.

The basic requirement for the design of a commissioning installation according to the invention with conveying modules according to the invention is merely a substantially plane, stable base on which the conveying modules can be placed. Adjacent conveying modules are advantageously coupled mechanically in a reversible manner to ensure permanently correct alignment. A uniform height and horizontal alignment can be achieved not only by using underlay members, but also by means such as height-adjustable feet.

The conveying modules are then connected to the current network, wherein with the advantageous variant, as already discussed, each conveying module in turn has sockets for at least one further conveying module, in such a manner that only a few conveying modules, at least one conveying module, have to be connected to an external current network. The current supply from these modules is tree-shaped over the entire commissioning installation. For data exchange with the installation control, the conveying modules are connected to the installation control via the own network of the conveying modules, or directly via a LAN, or by means of one or a plurality of network nodes, as discussed above for the conveying module 60'.

Not only commissioning installations having one plane can be highly modular as discussed above, but also those having two or a plurality of planes. For this purpose, the basic structure is designed in such a manner that it can be constructed from standardized components in a simple and efficient manner, with or without the inclusion of conveying modules.

In the case of the commissioning installations according to the invention discussed above, the commissioning of units of goods comprises not only sorting of the units of goods but also storage of units of goods, either in a provision field specifically provided for this purpose or in the commissioning field itself. Particularly when units of goods are supplied to a large number of commissioning units, the units of goods have to be temporarily stored for units of goods which are to be processed later in the intended sequence of provision. The storage can be static, i.e. without movement of the unit of goods during storage. However, it is advantageous to store dynamically, i.e. with continuous or occasional movement within the storage area, if this is advantageous for the overall function of the commissioning installation. The storage phase of a unit of goods can also flow smoothly into the subsequent sorting phase, i.e. the actual commissioning.

Depending on the weighting of the storage function or the commissioning function, installations according to the invention can not only be designed as actual commissioning installations as discussed above, but also as automated storage primarily serving for storage, in which the commissioning function is of secondary importance. The aforementioned embodiments of a commissioning installation according to the invention are also applicable to such storage systems according to the invention.

Figure 13:
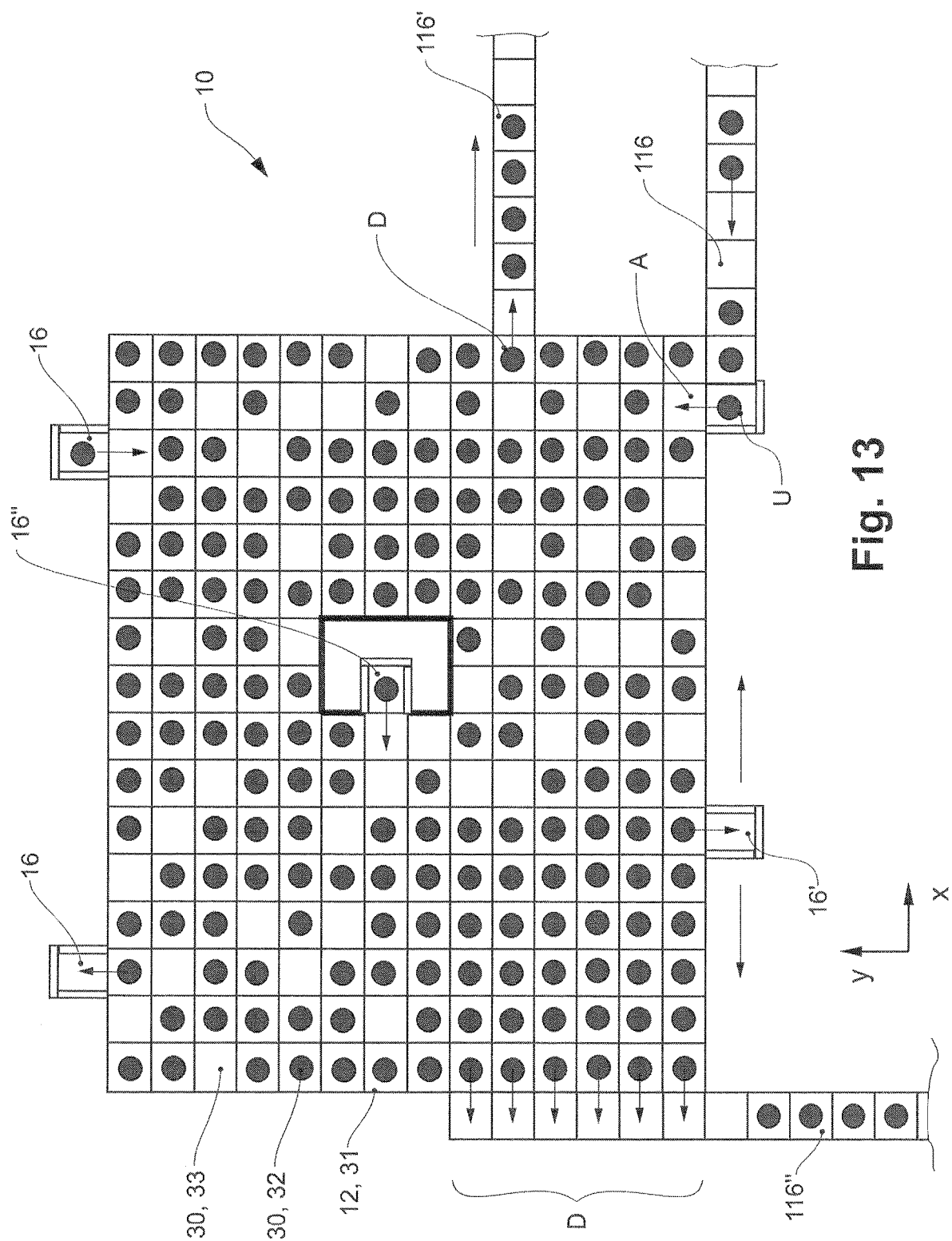
FIG. 13 is a schematic view of a single plane of an installation which is designed as a multistory storage.

An example of such an installation according to the invention, which is designed as a multi-level automated storage system 10, which is shown in FIG. 13, in a schematic view of a single storage plane 12. This consists of a grid field 31 having 16×14 places, on each of which an xy-conveying module (not shown for the sake of clarity) is arranged. The corresponding places 30 in the grid field 31 are either occupied by storage objects 32 or form unoccupied gaps 33. In functional terms, storage objects 32 can be units of goods or transfer platforms occupied by units of goods as well as unoccupied carrier platforms. An automated storage system 10 according to the invention has a larger number of planes, for example ten or twenty planes.

In addition to the advantages of the underlying principle of warehouse management, a storage system according to the invention also offers the advantage that better volume efficiency can be achieved than with conventional high-rack warehouses, where on average one third of the base surface is required for the operating devices. Furthermore, the achievable average time for a storage or retrieval procedure per unit of goods in a storage system according to the invention is considerably shorter, since a higher horizontal and vertical conveying performance can be achieved.

Two lifting devices 16 are arranged at the upper edge of the grid field 31 of the plane 12, which can remove units of goods from one plane and transport them to another plane. Preferably, such lifting devices are designed as actual elevators, which can approach a plurality of or all planes. For larger grid fields, lifting devices can also be provided within the grid field, for example to keep the maximum distance from any grid place 30 to a lifting device below a certain value. FIG. 13 shows an example of a lifting device 16" in the form of an elevator in the middle of the grid field. If, as in the example shown, the corresponding infrastructure of the lifting device 16" requires more base surface than a single grid place, correspondingly fewer grid places are available.

At the lower edge of the grid field another lifting device 16' is provided, in the form of a rack operating device, as used for high rack warehouses. Such a lifting device does not allow lifting procedures between different planes, but additionally also horizontal transport. Such rack operating devices 16' are comparatively inefficient in terms of space requirements and achievable transport performance. Firstly, horizontal transport within a plane can be performed via the xy-conveying modules. Secondly, purely vertical elevators can travel faster and require less base surface.

Units of goods can also be brought into or removed from the storage plane via long-distance conveyor systems. In FIG. 13, a remote conveying system 116 enables units of goods to be fed to a transfer point U, from where they can be conveyed individually to a receiving point A of the grid field and thus transferred to the storage system. Such a remote conveying system can be advantageously used to transfer units of goods from incoming deliveries, from other storage systems or from production installations into the storage system. The remote conveying system can, for example, be implemented as a slow-running continuous conveying belt, or as a chain of linear conveying modules.

Analogously, units of goods can also be discharged from the storage system via a remote conveying system. At the right edge of the grid field 31 units of goods are transferred from a single removal point D to a remote conveying system 116'. This can then convey the corresponding units of goods in a defined sequence for further processing. For example, the units of goods can be transported, fully commissioned, to a loading station where they are finally loaded into a truck. Alternatively, the units of goods can also be conveyed in only partially pre-sorted sequence to another installation according to the invention, which is designed as a commissioning installation in order to be fully commissioned there.

A further variant of the removal of units of goods is shown in the lower left corner of the grid field. Instead of transferring only one unit of goods to a conveying system at a time, five units of goods can be removed from the grid field along the x-axis in parallel and deposited at five removal points D, which are equipped with xy-conveying modules. Subsequently, the units of goods can be transferred together as a block along the y-axis to a remote conveying system 116".

In a storage system 10 according to the invention, not all of the aforementioned auxiliary devices 16, 16', 16", 116, 116', 116" are usually realized, or not on all planes of the installation.

In a possible embodiment of a storage system according to the invention, for example, one or a plurality of planes can be primarily intended for commissioning. Accordingly, on such a plane there are devices which allow units of goods to be removed in a (partially) sorted sequence. New units of goods to be commissioned are advantageously supplied via fast lifting devices.

One or a plurality of planes can be provided for the triage of newly added units of goods. New units of goods to be introduced into the storage system are advantageously placed on such a plane, where they can be pre-sorted and distributed to the different planes.

Further floors are provided for the actual storage function, which, apart from the grid field, substantially only require lifting devices for the efficient supply and removal of units of goods. In an installation primarily designed as a storage system, the largest number of floors will fall into this category.

In order to optimize the storage times and, above all, the retrieval times, interchangeable, identical units of goods are advantageously stored on the same plane, as this reduces the average access time to such a unit of goods: The higher the number of identical units of goods in a grid field, the lower the shortest possible access time to a unit of goods of this type statistically occurred.

The less frequently a certain unit of goods is needed, the less the influence of the access time to such a unit of goods on the access time per unit of goods on the overall average. Accordingly, a higher access time can be accepted for these units of goods without this having an excessive influence on the average access time, and therefore on the throughput performance of the installation. In a simplified example, if for every 100 requests for units of goods from a first group only one unit of goods from a second group is requested, having identical access times at the beginning, an increase of the access time to the second group by a factor of 10 has the same effect on the average access time as an increase of the access time to the first group by 9%. Accordingly, it makes sense to keep the access times for the first group as low as possible, while for the second group they can be increased with limited effect on the average access time to achieve a different goal.

The smaller the number of gaps on a storage plane or in a region of a storage field, the higher the achievable packing density in the storage system. At the same time, the statistically expected access time to a unit of goods from this storage plane or region increases, since fewer gaps are available for maneuvering and correspondingly more maneuvering steps are required to transport a certain unit of goods from one point to another. It is therefore advantageous to reduce the number of gaps in the grid field of a storage plane or in a certain region of a plane the less frequently the units of goods of the storage plane are retrieved on average. It is particularly advantageous to store units of goods having a similar expected query frequency together on one plane or in a certain region of a plane. Accordingly, the more densely a corresponding storage plane or storage region can be packed, the less frequently the units of goods stored therein are requested, without the average access time increasing excessively. In extreme cases, a plane may be completely occupied, in such a manner that prior to the necessary maneuvering procedures, at least one gap has to be created temporarily by removing a unit of goods from the plane concerned with a lifting device and moving it to another plane. This corresponds functionally to the transfer of a gap to a plane.

Advantageously, the control device of a storage system according to the invention controls the allocation of the different storage planes in such a manner that, based on predetermined rules, the lowest possible average access time, the highest possible packing density or another optimization goal is achieved. The weighting of the different performance values can be specified by the user.

As already explained, the installation control can distribute the units of goods of a given storage content, for example according to the type or access frequency, staggered on different storage planes and distribute the gaps accordingly. Appropriate solutions are advantageously determined via suitable simulations, if necessary under consideration of certain basic rules or starting variants.

In a simplified example, a basic quantity $N_{total} = \Sigma_i n(i)$ of units of goods of type i is stored in a storage system, having a requirement frequency $a(i)$, with $\Sigma_i a(i) = 1$. The average packing density of the storage system is therefore given in this explanatory example. The storage content is not to be understood statically, but as a kinetic equilibrium in which the supply of new units of goods continuously balances the removal of units of goods from the storage.

The storage system comprises a total of $M_{total}$ storage places, distributed on k planes of equal size. The number of gaps is given by $L_{total}=M_{total}-N_{total}$. For example, the installation control now distributes the different units of goods i and the gaps to the k storage planes, having n(i,k) units of goods i or q(k) gaps on the k plane, in such a manner that the average access time Z is minimal. The average access time is derived from $Z=\Sigma_i$ a(i) Z(i), having the average access time Z(i) for the unit of goods i. Thereby, based on simulations, the expected access time for a unit of goods in a plane k having q(k) gaps can be provided as function z(k,q). The average access time Z(i) for the unit of goods i is $Z(i)=\Sigma_k$ n(i,k) n(i)$^{-1}$ z(k,q(k)). Therefore a minimum of the function $$Z=\Sigma_i a(i)[\Sigma_k n(i,k)n(i)^{-1}z(k,q(k))]$$

can be found, having n(i,k) and q(k) as adjustable parameters, which is done most efficiently with numerical techniques including simulations for such multidimensional optimization problems.

In a more complex application case, the number of different units of goods and consequently the number of gaps can also be used as optimization parameters for an optimization and, if necessary, the packing density P=N/M as a further optimization target.

The access time z(k,q) can also be part of the optimization. The effective access time depends directly on the distribution of the units of goods and gaps within the plane, which can be controlled by the installation control. The control of the lifting devices also influences the access times of the different planes.

A control device of a storage system according to the invention can also consider empirical values for storage control, as well as planned storage and retrieval of units of goods, i.e. short-term effects, as well as long-term shifts in the composition of the contents of the storage.

Figure 14:
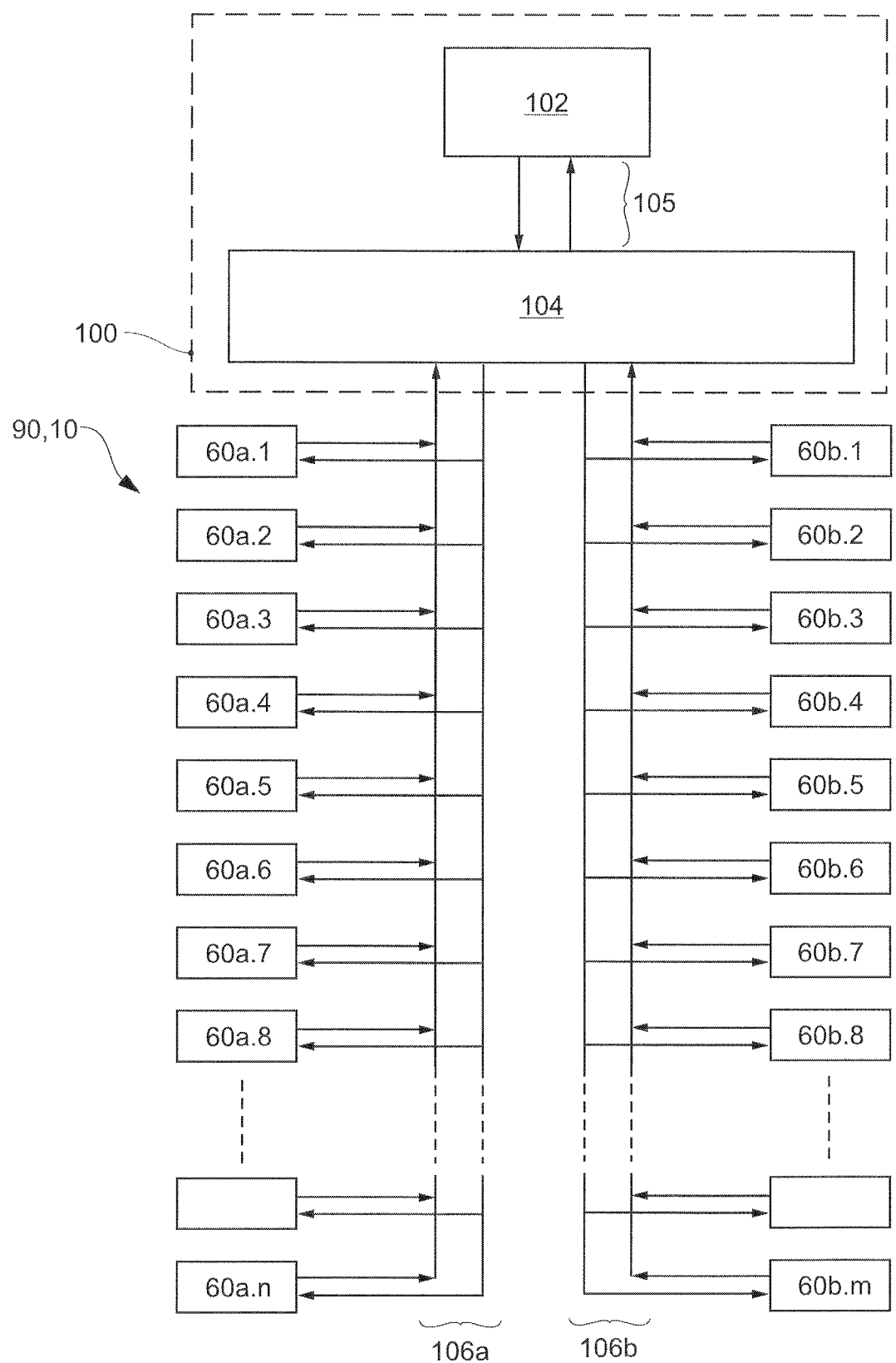
FIG. 14 is a schematic representation of the functional connections between conveying modules and the installation control in a possible embodiment of an installation according to the invention.
Figure 15A:
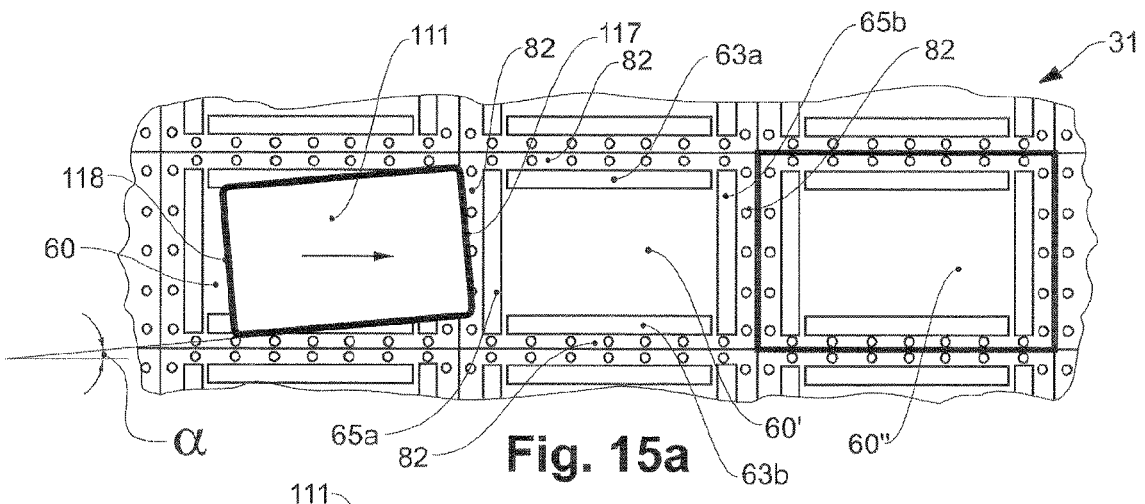
FIG. 15(a) is a schematic representation of one phase of a method for the position correction of a unit of goods on a grid field of xy-conveying modules.
Figure 15B:
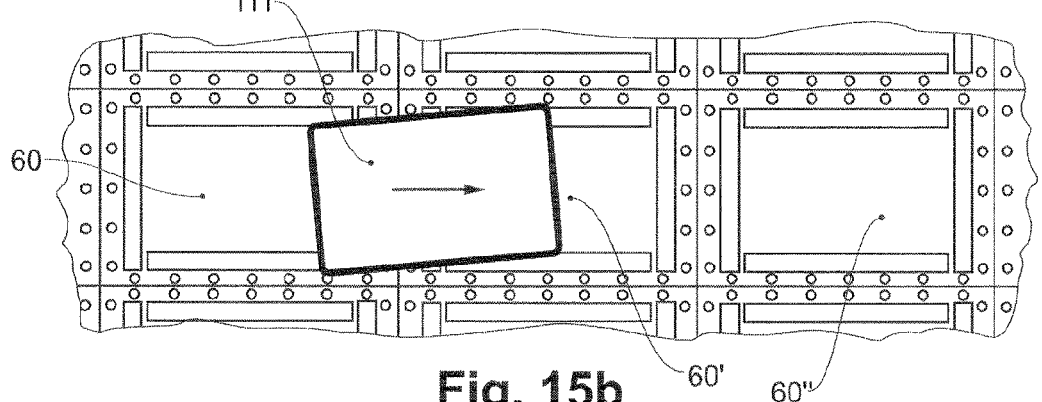
FIG. 15(b) is a schematic representation of another phase of a method for the position correction of a unit of goods on a grid field of xy-conveying modules.
Figure 15C:
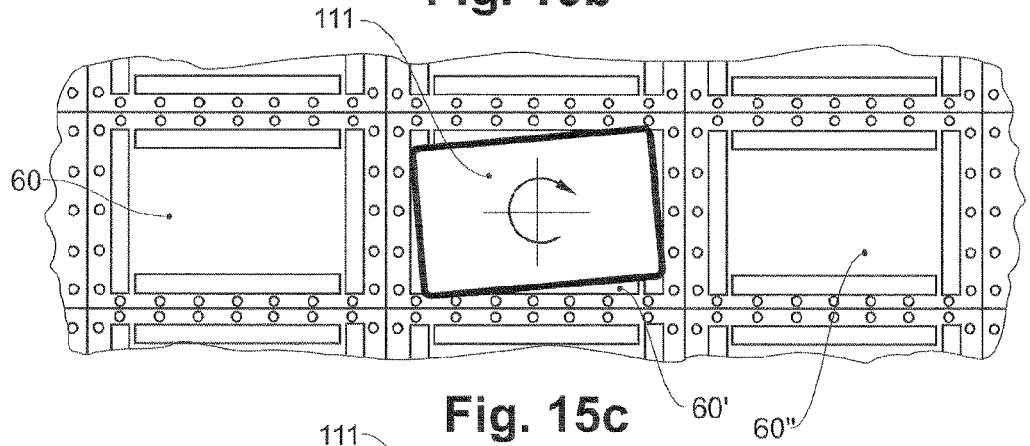
FIG. 15(c) is a schematic representation of yet another phase of a method for the position correction of a unit of goods on a grid field of xy-conveying modules.
Figure 15D:
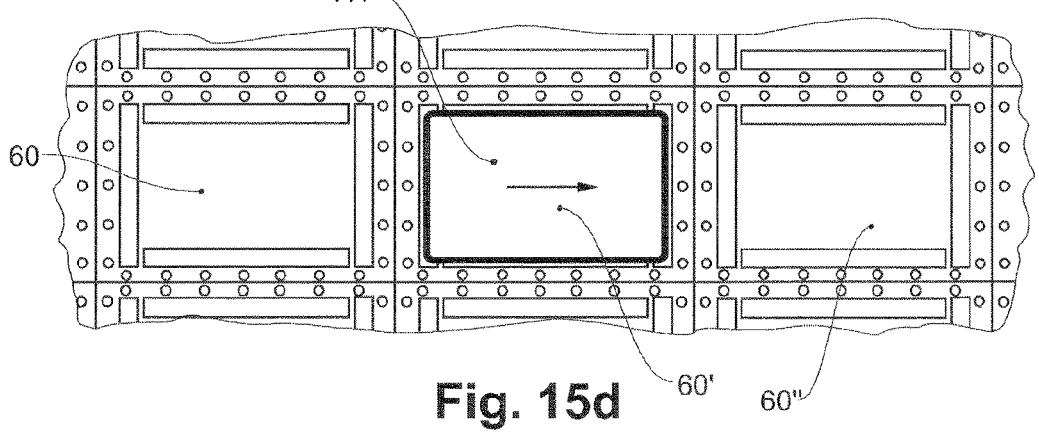
FIG. 15(d) is a schematic representation of still another phase of a method for the position correction of a unit of goods on a grid field of xy-conveying modules.

The functional design of a possible advantageous embodiment of an installation 90, 10 according to the invention is shown schematically in FIG. 14. The installation comprises a control unit 100 and a plurality of substantially identical conveying modules 60a.1-60a.n and 60b.1-60b.m. The spatial arrangement of the conveying modules is not shown in FIG. 14, but only the functional linkage of the control system. The members can therefore be arranged in a common grid field, or in two or a plurality of different grid fields, or even on different planes. The control device 100 of the installation comprises a planning unit 102 and a control unit 104. Instead of one, a plurality of control units can be provided, for example for different grid fields.

The object of the planning unit 102 is, amongst other things, to determine the necessary movements of the individual unit of goods on the individual conveying modules based on existing operational targets and the given geometry of the grid field. Via a suitable communication channel 105, for example an Ethernet connection, the planning unit 102 transmits the collected instructions for the next step to the control unit 104.

Based on the global instructions of the planning unit 102, the control unit 104 determines the necessary conveying procedures to be performed by the conveying modules in the following step and transmits corresponding instructions to the individual conveying modules via suitable communication channels 106a, 106b, for example an Ethernet connection. The control devices of the conveying modules in turn assume the detailed control of the respective conveying module, particularly the control of the conveying devices and lifting devices.

After the conveying procedure has been completed, the correct execution of which can be verified by the conveying modules involved, for example by suitable sensor devices, the conveying modules report the completion of the instructions to the control unit via the communication channels 106a, 106b. If necessary, status messages, particularly error messages, can also be sent back to the control unit 104.

The control unit 104 in turn confirms the correct execution of the conveying procedures of the step performed to the planning unit 102. If problems have occurred with individual conveying procedures, for example if individual conveying procedures between two modules have not been performed correctly, corresponding error messages are also forwarded to the planning unit, which takes them into consideration when planning the next step.

Subsequently, the planning unit sends instructions for the next step to the control unit. The next cycle begins.

The different planes of the control system are functionally separated in this embodiment. The planning unit determines the abstract conveying procedures to be executed. The control unit determines the specific conveying procedures that the conveying modules have to perform in order to achieve the specifications of the planning unit. The module controls in turn control the various actuators of the respective conveying modules in such a manner that the desired conveying procedures result.

In a possible advantageous variant of a control method, the installation is initialized during commissioning or after an interruption in operation, for example due to maintenance work. The planning unit supplies data on the structure of the grid field, particularly the absolute identities of the various modules and the topological positioning thereof, to the control unit. The control unit then assigns a temporary address in the data network to the individual conveying modules. After performing a function test, the conveying modules send a status message back to the control unit. Finally, the control unit sends a consolidated status message to the planning unit.

The communication channels 105, 106a, 106b can be implemented as a common communication channel, for example as a Local Area Network (LAN). However, as in the example shown, it is advantageous to configure the communication channels separately, for example via separate LAN for communication between the planning unit and the control units and for communication between the control unit and conveying modules. Particularly in the example shown, two independent data channels 106a, 106b are provided for two subgroups of conveying modules. This has the advantage, for example, that the operation of a first module group (defined by the partial quantity of modules connected to a first LAN 106a) is independent of the operation of a second module group (defined by the partial quantity of modules connected to a second LAN 106b). For example, the first module group can be set to a sleep mode, in which all conveying procedures are stopped, or it can be made completely currentless, for example, in order to be able to perform maintenance work without danger. At the same time the operation of the second module group can be continued. Such a separation is particularly advantageous if the different module groups represent separate grid fields.

The present invention is not limited in scope to the specific embodiments described herein. Rather, for a person skilled in the art, the description and the corresponding figures result in various further modifications of the present invention in addition to the examples disclosed herein, which also fall within the scope of the claims. In addition, various references are cited in the description, the disclosure content of which is hereby included in the entirety thereof by reference in the description.

The invention claimed is:

1. A conveying module for horizontally conveying units of goods, comprising:
   a single base structure for storing the conveying module on a base;
   a first conveying device mounted on the single base structure, which is designed to convey a unit of goods in a first conveying direction in a horizontal;
   a second conveying device mounted on the single base structure, which is designed to convey a unit of goods in a second conveying direction in the horizontal, wherein the second conveying direction is substantially perpendicular to the first conveying direction;
   a carrier structure mounted on top of the single base structure, the carrier structure configured to carry a unit of goods;
   a first lifting device that is designed to raise and/or lower the first conveying device in the vertical in relation to the carrier structure and/or the second conveying device, between a lower position and an upper position; and
   a second lifting device that is designed to raise and/or lower the second conveying device in the vertical in relation to the carrier structure and/or the first conveying device, between a lower position and an upper position;
   wherein the conveying module has a substantially rectangular basic shape; and
   wherein a unit of goods that is located on the conveying module rests on the carrier structure when the first conveying device and the second conveying device are in the lower position.

2. The conveying module according to claim 1, having an electronic control device that is designed to control the operation of the first and of the second conveying device and of the first and second lifting device.

3. The conveying module according to claim 2, wherein the control device of the conveying module is designed to exchange data with control devices of adjacent conveying modules to synchronize the operation of the conveying devices of the adjacent conveying modules.

4. The conveying module according to claim 2, wherein the control device of the conveying module has a network interface to a local data network, for example an Ethernet interface or a WLAN interface.

5. The conveying module according to claim 1, wherein the first conveying device defines a first resting plane, the second conveying device defines a second resting plane, and the carrier structure defines a third resting plane, wherein in the upper position of the first conveying device or of the second conveying device, the first resting plane or the second resting plane is arranged above the third resting plane, and wherein a unit of goods that is located on the conveying module rests on an uppermost of the three aforementioned resting planes.

6. The conveying module according to claim 1, wherein the first lifting device moves the first conveying device translationally between the lower position and the upper position during lifting or lowering; and/or wherein the second lifting device moves the second conveying device translationally between the lower position and the upper position during lifting or lowering.

7. The conveying module according to claim 1, wherein the first lifting device rotates the first conveying device between the lower position and the upper position during lifting or lowering; and/or wherein the second lifting device rotates the second conveying device between the lower position and the upper position during lifting or lowering.

8. The conveying module according to claim 1, having a third lifting device, which is designed to raise and/or lower the carrier structure in the vertical (z) in relation to the base structure between a lower position and an upper position.

9. The conveying module according to claim 1, having sensor devices for detecting the passage of a unit of goods during a conveying procedure, and/or sensor devices for determining the alignment of a unit of goods located on the conveying module, and/or sensor devices for reading an identification element, for example an RFID or an optical code, of a unit of goods that is located on the conveying module.

10. The conveying module according to claim 1, having means for weighing a unit of goods that is located on the conveying module.

11. The conveying module according to claim 1, wherein the conveying module has a substantially rectangular basic shape.

12. The conveying module according to claim 1, wherein the conveying module has one or a plurality of guiding members, which are designed to spatially limit in a certain direction movements in the horizontal plane of units of goods arranged on and/or conveyed by the conveying module.

13. The conveying module according to claim 12, wherein the at least one guiding member comprises a guide wheel rotatable about the vertical.

14. The conveying module according to claim 12, wherein the at least one guiding member comprises a guide rail or a guide sheet that is arranged parallel to an outer side of the conveying module.

15. The conveying module according to claim 12, wherein the at least one guiding member is movable between a first position and a second position, and wherein the at least one guiding member is operative in the first position and can spatially limit in a certain direction movements in the horizontal plane of units of goods arranged on and/or conveyed by the conveying module, and the at least one guiding member is non-operative in the second position and cannot spatially limit a horizontal movement of a unit of goods.

16. The conveying module according to claim 1, wherein the first conveying device and/or the second conveying device is/are a belt conveyor or a roller conveyor.

17. The conveying module according to claim 1, wherein the first conveying device and/or the second conveying device is a belt conveyor in which the conveying belts rest on roller arrangements and/or anti-friction bearings.

18. The conveying module according to claim 1, wherein the first conveying device and/or the second conveying device is a belt conveyor comprising two or a plurality of conveying belts, particularly two or a plurality of parallel conveying belts.

19. The conveying module according to claim 18, wherein the two or a plurality of conveying belts can run at different speeds.

20. The conveying module according to claim 18, wherein the two or a plurality of conveying belts are separately controllable by a control device of the conveying module.

21. An installation for storing and/or commissioning units of goods, comprising:
   a plurality of conveying modules according to claim 1; and a control device for controlling the aforementioned conveying modules.

22. The installation according to claim 21, wherein the conveying modules are arranged in one or a plurality of rectangular grids on which units of goods can be shifted in the two conveying directions (x, y).

23. The installation according to claim 21, wherein the conveying modules are arranged in a plurality of rectangular grids on which units of goods can be shifted in the two conveying directions (x, y),
wherein the various rectangular grids are arranged on one or on a plurality of planes and are operatively connected to one another via conveying devices, for example conveying modules or lifting devices.

24. The installation according to claim 21, wherein a plurality of transport platforms are arranged on the conveying modules, on which units of goods can be supported and can conveyed in the installation together with the transport platform.

25. The installation according to claim 21, wherein the control device of the installation comprises at least one control unit, which is designed to control the conveying modules, and a planning unit, which is designed to determine conveying procedures and to transmit corresponding conveying instructions to the at least one control unit.

26. The installation according to claim 21, wherein the control device of the installation is designed to perform a method according to claim 21.

27. A method for controlling an installation according to claim 21 for storing and/or commissioning units of goods, in which:
units of goods are shifted on a first grid field of conveying modules in such a manner that a certain unit of goods comes to rest on a certain point (A, D) of the grid field, wherein the units of goods are distributed on the grid field in such a manner that at least one conveying module remains unoccupied and forms a gap; and
the certain unit of goods is removed from the installation at the certain point (A, D) or is transported to another grid field;
wherein the aforementioned steps are repeated in such a manner that the units of goods removed from the installation or conveyed into a second grid field of conveying modules form a certain sequence.

28. The method according to claim 27, wherein the units of goods removed from the installation or conveyed into a second grid field are made available for further use (D) grouped according to certain commissioning orders.

29. The method according to claim 27, wherein units of goods are distributed to a plurality of third grid fields of conveying modules from which they can be removed again at a later time and used for further steps.

30. The method according to claim 29, wherein the units of goods are distributed over the third grid fields in such a manner that the average time required until on average a unit of goods would be available for further use does not exceed a certain value.

31. The method according to claim 27, wherein the method is performed with an installation.

32. The method for controlling a conveying module according to claim 19, in which
the alignment of a unit of goods in relation to the horizontal conveying directions (x, y) of the conveying module is determined;
the aforementioned unit of goods is at least partially supported on two or a plurality of conveying belts of the conveying module; and
the aforementioned conveying belts are controlled in such a manner that the combined movement of the conveying belts causes a rotational movement of the unit of goods about the vertical (z) due to the static and/or sliding frictional contact of the conveying belts with the aforementioned unit of goods.

33. The method according to claim 32, wherein the rotational movement of the unit of goods about the vertical (z) is performed simultaneously with a translational movement of the unit of goods during conveying in a conveying direction (x, y).

34. The method according to claim 32, wherein an actual rotational movement and/or translational movement of the unit of goods is determined, and the corresponding data is used to control the two or a plurality of conveying belts of the conveying module.

* * * * *